(12) United States Patent
Li et al.

(10) Patent No.: US 10,516,588 B2
(45) Date of Patent: Dec. 24, 2019

(54) APPARATUS, SYSTEM, AND METHOD FOR OBTAINING QUALITY OF SERVICE PARAMETER OF VOICE OVER INTERNET PROTOCOL SERVICE

(71) Applicant: Huawei Technologies Co., Ltd., Shenzhen (CN)

(72) Inventors: Bingzhao Li, Beijing (CN); Xiaodong Yang, Shenzhen (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 15/473,857

(22) Filed: Mar. 30, 2017

(65) Prior Publication Data

US 2017/0207988 A1 Jul. 20, 2017

Related U.S. Application Data

(63) Continuation of application No. PCT/CN2014/088053, filed on Sep. 30, 2014.

(51) Int. Cl.
*H04L 12/26* (2006.01)
*H04L 12/24* (2006.01)
(Continued)

(52) U.S. Cl.
CPC .............. *H04L 43/08* (2013.01); *H04L 41/06* (2013.01); *H04L 41/5032* (2013.01);
(Continued)

(58) Field of Classification Search
None
See application file for complete search history.

(56) References Cited

U.S. PATENT DOCUMENTS

2003/0223714 A1* 12/2003 Conrad ................ G02B 6/4404
385/114
2008/0112549 A1   5/2008 Yoon et al.
(Continued)

FOREIGN PATENT DOCUMENTS

CN       101184134 A    5/2008
CN       101355465 A    1/2009
(Continued)

OTHER PUBLICATIONS

Catt, "Possible Measurement Types for MDT QoS Verification," XP50565555, R2-120772, Feb. 6-10, 2012, 4 pages.
(Continued)

*Primary Examiner* — Lonnie V Sweet
(74) *Attorney, Agent, or Firm* — Conley Rose, P.C.

(57) ABSTRACT

An apparatus, a system, and a method for obtaining a quality of service parameter of a voice over Internet Protocol (VoIP) service is presented. The apparatus obtains a quality of service parameter of a VoIP service, and the apparatus sends a quality parameter report of the VoIP service to a centralized processing device. The quality parameter report of the VoIP service includes the quality of service parameter of the VoIP service, so that a network system obtains quality of service of the VoIP service according to the quality of service parameter of the VoIP service, further helping an operator control and adjust the network system based on the quality of service of the VoIP service.

20 Claims, 10 Drawing Sheets

(51) Int. Cl.
   H04L 12/851   (2013.01)
   H04L 29/08    (2006.01)
   H04M 7/00     (2006.01)
(52) U.S. Cl.
   CPC ........ *H04L 41/5087* (2013.01); *H04L 43/087* (2013.01); *H04L 43/0858* (2013.01); *H04L 47/24* (2013.01); *H04L 69/324* (2013.01); *H04M 7/006* (2013.01); *H04L 41/5019* (2013.01)

(56) References Cited

U.S. PATENT DOCUMENTS

| | | | |
|---|---|---|---|
| 2008/0137552 A1* | 6/2008 | Lee | H04L 41/5032 370/252 |
| 2009/0059798 A1 | 3/2009 | Lee et al. | |
| 2009/0257361 A1* | 10/2009 | Deshpande | H04L 43/50 370/252 |
| 2010/0029325 A1* | 2/2010 | Wang | H04W 72/1215 455/553.1 |
| 2012/0275421 A1* | 11/2012 | Vukovic | H04W 72/1268 370/329 |
| 2013/0114446 A1* | 5/2013 | Liu | H04W 24/10 370/252 |
| 2013/0181865 A1* | 7/2013 | Hannan | G01S 19/46 342/357.29 |
| 2016/0301571 A1* | 10/2016 | Wang | H04L 43/0829 |
| 2018/0077594 A1* | 3/2018 | He | H04L 43/0852 |

FOREIGN PATENT DOCUMENTS

| | | |
|---|---|---|
| CN | 101369931 A | 2/2009 |
| EP | 2806674 A1 | 11/2014 |
| WO | 2013108819 A1 | 7/2013 |

OTHER PUBLICATIONS

Mediatek, "[77#24] Joint: MDT Latency Measurement," XP50606253, R2-121331, Mar. 24-30, 2012, 8 pages.
Foreign Communication From a Counterpart Application, European Application No. 14903224.5, Extended European Search Report dated Jul. 21, 2017, 13 pages.
"Series G: Transmission Systems and Media, Digital Systems and Networks, Digital terminal equipment—Coding of voice and audio signals, Pulse code modulation (PCM) of voice frequencies, Amendment 2: New Appendix Audio quality enhancement toolbox," ITU-T, G.711, Amendment 2, Nov. 2009, 16 pages.
Machine Translation and Abstract of Chinese Publication No. CN101355465, Jan. 28, 2009, 19 pages.
Machine Translation and Abstract of Chinese Publication No. CN101369931, Feb. 18, 2009, 19 pages.
"Series G: Transmission Systems and Media, Digital Systems and Networks, Digital terminal equipment—Coding of voice and audio signals, Pulse code modulation (PCM) of voice frequencies, Amendment 2: New Appendix III—Audio quality enhancement toolbox," ITU-T, G.711, Amendment 2, Nov. 2009, 16 pages.
"Series G: Transmission Systems and Media, Digital Systems and Networks, Digital terminal equipments—Coding of voice and audio signals, Coding of speech at 8 kbit/s using conjugate-structure algebraic-code-excited linear prediction (CS-ACELP)," ITU-T, G.729, Jun. 2012, 152 pages.
Foreign Communication From a Counterpart Application, PCT Application No. PCT/CN2014/088053, English Translation of International Search Report dated Jun. 17, 2015, 2 pages.
Foreign Communication From a Counterpart Application, PCT Application No. PCT/CN2014/088053, English Translation of Written Opinion dated Jun. 17, 2015, 10 pages.

* cited by examiner

APPARATUS, SYSTEM, AND METHOD FOR OBTAINING QUALITY OF SERVICE PARAMETER OF VOICE OVER INTERNET PROTOCOL SERVICE

CROSS-REFERENCE TO RELATED APPLICATIONS

This application is a continuation of International Application No. PCT/CN2014/088053, filed on Sep. 30, 2014, the disclosure of which is hereby incorporated by reference in its entirety.

TECHNICAL FIELD

The present disclosure relates to communications technologies, and in particular, to an apparatus, a system, and a method for obtaining a quality of service parameter of a voice over Internet Protocol service.

BACKGROUND

Voice over Internet Protocol (VoIP) is a technology for digitizing an analog signal (voice) for real-time transmission in a form of a data packet over an IP network. Because a VoIP service is applied to Internet and global IP network environments, the VoIP service can provide more and better services than a conventional service. As a wireless network evolves continuously, VoIP service applications in Long Term Evolution (LTE) also gradually become a field of interest in the art. In a broad sense, the VoIP service is not only a voice over IP service, but also may bear other multimedia services, such as a video call and instant messaging.

After the VoIP service is deployed, an operator needs to monitor the VoIP service to ensure quality of service of the VoIP service. A VoIP delay, a VoIP jitter, a VoIP packet loss, and the like are important parameters that affect the quality of service of the VoIP service. The VoIP delay must be controlled within an appropriate value; otherwise, a voice collision is caused between a listening party and a speaking party. The VoIP jitter refers to a time difference of arrival of all sent data packets in an IP call process. If a call includes different channel transmission times, a VoIP jitter exists. In the VoIP call, an effect presented by the VoIP jitter is similar to an effect generated by a packet loss, and some letters or words are incorrect or are heard unclearly. A value of the jitter depends on a difference between channel transmission times of data packets. If the difference is greater, the jitter is also greater. In the network, there are mainly two VoIP packet loss cases. One is that more or less VoIP packets are lost randomly, and when a collision occurs in the network, one or two data packets are lost occasionally. The other is a burst VoIP packet loss, which means that at least one data packet is lost continuously, and voice quality is obviously affected.

Therefore, how to obtain parameters related to quality of service of the VoIP service becomes a problem to be resolved in the art.

SUMMARY

The present disclosure provides an apparatus, a system, and a method for obtaining a quality of service parameter of a VoIP service, so as to obtain a parameter related to quality of service of a VoIP service.

According to a first aspect of the present disclosure, an apparatus for obtaining a quality of service parameter of a VoIP service is provided and includes an obtaining module configured to obtain a quality of service parameter of a VoIP service, where the quality of service parameter of the VoIP service includes at least one of the following: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling (SPS) resource utilization efficiency, or VoIP call drop information; and a sending module configured to send a quality parameter report of the VoIP service to a centralized processing device, where the quality parameter report of the VoIP service includes the quality of service parameter of the VoIP service.

With reference to the first aspect, in a first possible implementation manner, the apparatus further includes a receiving module configured to receive, before the obtaining module obtains the quality of service parameter of the VoIP service, an activation command message sent by the measurement trigger device, where the activation command message is used to instruct the obtaining module to obtain the quality of service parameter of the VoIP service.

With reference to the first aspect, in a second possible implementation manner, the obtaining module is configured to select, according to the activation command message, at least one user equipment (UE) for performing a measurement, and obtain the quality of service parameter of the VoIP service.

With reference to the first aspect, in a third possible implementation manner, the selecting at least one UE for performing a measurement needs to meet the following selection condition: whether the at least one UE performs the VoIP service; and/or whether the at least one UE agrees to provide a measurement service for the apparatus.

With reference to the first aspect, in a fourth possible implementation manner, the activation command message includes an identity of the at least one UE; and the obtaining module is configured to measure the at least one corresponding UE according to the identity of the at least one UE, and obtain the quality of service parameter of the VoIP service of the at least one UE.

With reference to the first aspect, in a fifth possible implementation manner, the activation command message further includes quality of service parameter information that needs to be obtained, and the quality of service parameter information that needs to be obtained is used to represent any one or a combination of the following quality of service parameters: the VoIP service delay, the VoIP service jitter, the VoIP service encoding type, the VoIP service packet size, the VoIP service packet loss rate, the VoIP service encoding rate, the mean opinion value of the VoIP service, the VoIP signaling delay, the VoIP access failure information, the VoIP handover failure information, the SPS resource utilization efficiency, or the VoIP call drop information.

With reference to the first aspect, in a sixth possible implementation manner, the obtaining module is further configured to determine, before obtaining the quality of service parameter of the VoIP service, whether the VoIP service meets a measurement condition; and if the VoIP service meets the measurement condition, the obtaining module is configured to select at least one UE for performing a measurement, and obtain the quality of service parameter of the VoIP service.

With reference to the first aspect, in a seventh possible implementation manner, the VoIP access failure information includes any one or a combination of the following: the VoIP access failure information count, identity information of a corresponding serving cell during the VoIP access failure, corresponding time information during the VoIP access failure, reference signal quality or strength of a corresponding cell during the VoIP access failure, or transmit power information of the UE during the VoIP access failure.

With reference to the first aspect, in an eighth possible implementation manner, the VoIP handover failure information includes any one or a combination of the following: the VoIP handover failure count, reference signal quality or strength of a corresponding source cell and/or target cell during the VoIP handover failure, transmit power information of the UE during the VoIP handover failure, identity information of a corresponding source cell during the VoIP handover failure, or identity information of a corresponding target cell during the VoIP handover failure.

With reference to the first aspect, in a ninth possible implementation manner, the VoIP service delay includes an uplink delay of the VoIP service and/or a downlink delay of the VoIP service; and the VoIP service jitter includes an uplink jitter of the VoIP service and/or a downlink jitter of the VoIP service.

With reference to the first aspect, in a tenth possible implementation manner, the obtaining module is configured to obtain a downlink delay of a data packet of the VoIP service according to a first time and a second time, where the first time is a time of receiving an acknowledgement message of a last segment of the data packet, and the second time is a time of arrival of the data packet at a Packet Data Convergence Protocol (PDCP) layer of the apparatus.

With reference to the first aspect, in an eleventh possible implementation manner, the obtaining module is configured to perform averaging on downlink delays of all the data packets of the VoIP service in a time period, and obtain an average value of the downlink delays of the VoIP service in the time period; or compare a downlink delay of each data packet of the VoIP service in a time period with a downlink delay threshold, and collect statistics of downlink delays of the data packets of the VoIP service that are greater than or equal to the downlink delay threshold.

With reference to the first aspect, in a twelfth possible implementation manner, the obtaining module is configured to obtain a downlink jitter of the VoIP service according to a difference between downlink delays of any two data packets of the VoIP service in a time period.

With reference to the first aspect, in a thirteenth possible implementation manner, the obtaining module is configured to perform averaging on all downlink jitters of the VoIP service in the time period, and obtain an average value of the downlink delays of the VoIP service in the time period; or compare each downlink jitter of the VoIP service in the time period with a downlink jitter threshold, and collect statistics of downlink jitters of the VoIP service that are greater than or equal to the downlink jitter threshold.

With reference to the first aspect, in a fourteenth possible implementation manner, the obtaining module is configured to obtain an uplink delay of a first data packet of the VoIP service according to a difference between an acknowledgement time and an arrival time, where the acknowledgement time is a time of sending an acknowledgement message of a last segment of the first data packet to the UE, and the arrival time is a time of receiving a scheduling request corresponding to the first data packet; and obtain an uplink delay of any other data packet of the VoIP service according to the uplink delay of the first data packet of the VoIP service and a Real-time Transport Protocol (RTP) timestamp of the first data packet.

With reference to the first aspect, in a fifteenth possible implementation manner, the obtaining module is configured to obtain a first uplink delay of a data packet of the VoIP service according to a difference between a third time and a fourth time, where the third time is a time of receiving the data packet, and the fourth time is a time corresponding to an RTP timestamp of the data packet; obtain a delay set including delays of all the data packets in a time period, where the delay set includes first uplink delays of all the data packets of the VoIP service; obtain a first data packet having a shortest first delay in the delay set, as a reference data packet for delay calculation; and obtain an uplink delay of any other data packet of the VoIP service according to the corresponding uplink delay of the first data packet.

With reference to the first aspect, in a sixteenth possible implementation manner, the receiving module is further configured to receive, before the obtaining module obtains the quality of service parameter of the VoIP service, a timestamp value reported by the at least one UE; the obtaining module is further configured to obtain a correspondence between a network time and the UE-side time according to the timestamp value; and the obtaining module is configured to obtain, according to the correspondence between the network time and the UE-side time, a first network time corresponding to a time of sending a first data packet, obtain a second network time corresponding to a time of acknowledging reception of the first data packet, and obtain an uplink delay of the first data packet of the VoIP service according to the first network time and the second network time.

With reference to the first aspect, in a seventeenth possible implementation manner, the obtaining module is configured to obtain a data packet sent by the at least one UE, where the data packet carries a sending timestamp, and a correspondence exists between the sending timestamp and a network time of the apparatus; and obtain, according to the correspondence, the network time corresponding to the sending timestamp, and calculate an uplink delay of the data packet of the VoIP service according to the network time corresponding to the sending timestamp.

With reference to the first aspect, in an eighteenth possible implementation manner, the obtaining module is configured to perform averaging on uplink delays of all the data packets of the VoIP service in the time period, and obtain an average value of the uplink delays of the VoIP service in the time period; or compare an uplink delay of each data packet of the VoIP service in the time period with an uplink delay threshold, and collect statistics of downlink delays of the VoIP service that are greater than or equal to the uplink delay threshold.

With reference to the first aspect, in a nineteenth possible implementation manner, the obtaining module is configured to obtain an uplink jitter of the VoIP service according to a difference between uplink delays of any two data packets of the VoIP service in a time period.

With reference to the first aspect, in a twentieth possible implementation manner, the obtaining module is configured to determine the difference between the uplink delays of the any two data packets of the VoIP service according to times of receiving the any two data packets and times corresponding to RTP timestamps of the any two data packets.

With reference to the first aspect, in a twenty-first possible implementation manner, the obtaining module is configured to perform averaging on all uplink jitters of the VoIP service in the time period, and obtain an average value of the uplink jitters of the VoIP service in the time period; or compare each uplink jitter of the VoIP service in the time period with an uplink jitter threshold, and collect statistics of uplink jitters of the VoIP service that are greater than or equal to the uplink delay threshold.

With reference to the first aspect, in a twenty-second possible implementation manner, the sending module is further configured to send a VoIP service measurement instruction message to at least one UE, where the VoIP service measurement instruction message instructs the UE to measure quality of service parameter information of the VoIP service, and the quality of service parameter information of the VoIP service is used to represent any one or a combination of the following parameters: the VoIP service delay, the VoIP service jitter, the VoIP service encoding type, the VoIP service packet loss rate, the VoIP service encoding rate, the mean opinion value of the VoIP service, the VoIP signaling delay, the VoIP access failure information, the VoIP handover failure information, the SPS resource utilization efficiency, or the VoIP call drop information; and the receiving module is further configured to receive a VoIP service measurement record report message sent by the at least one UE, where the VoIP service measurement record report message includes the quality of service parameter.

With reference to the first aspect, in a twenty-third possible implementation manner, the VoIP call drop information includes any one or a combination of the following parameters: a VoIP call count, a VoIP call drop count, and a VoIP call drop rate.

According to a second aspect of the present disclosure, an apparatus for obtaining a quality of service parameter of a VoIP service is provided and includes a receiving module configured to receive a VoIP service measurement instruction message sent by a wireless access device, where the VoIP service measurement instruction message instructs a measurement module to measure quality of service parameter information of a VoIP service, and the quality of service parameter information of the VoIP service is used to represent any one or a combination of the following quality of service parameters: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, SPS resource utilization efficiency, or VoIP call drop information; the measurement module configured to perform a measurement to obtain the quality of service parameter; and a sending module configured to send a VoIP service measurement record report message to the wireless access device, where the VoIP service measurement record report message includes the quality of service parameter.

With reference to the second aspect, in a first possible implementation manner, the VoIP access failure information includes any one or a combination of the following: the VoIP access failure information count, identity information of a corresponding serving cell during the VoIP access failure, corresponding time information during the VoIP access failure, identity information of a corresponding serving cell during the VoIP access failure, reference signal quality or strength of a corresponding cell during the VoIP access failure, or transmit power information of UE during the VoIP access failure.

With reference to the second aspect, in a second possible implementation manner, the VoIP handover failure information includes any one or a combination of the following: the VoIP handover failure count, reference signal quality or strength of a corresponding source cell or target cell during the VoIP handover failure, transmit power information of UE during the VoIP handover failure, identity information of a corresponding source cell during the VoIP handover failure, or identity information of a corresponding target cell during the VoIP handover failure.

With reference to the second aspect, in a third possible implementation manner, the VoIP service delay includes an uplink delay of the VoIP service; and the VoIP service jitter includes an uplink jitter of the VoIP service.

With reference to the second aspect, in a fourth possible implementation manner, the measurement module is configured to obtain an uplink delay of a data packet of the VoIP service according to a difference between a time of receiving an acknowledgement and a time of generating the data packet, where the time of receiving the acknowledgement is a time at which the receiving module receives an acknowledgement message sent by the wireless access device for a last segment of the data packet, and the time of generating the data packet is a time at which the UE generates the data packet.

With reference to the second aspect, in a fifth possible implementation manner, the measurement module is configured to perform averaging on uplink delays of all the data packets of the VoIP service in a time period, and obtain an average value of the uplink delays of the VoIP service in the time period; or compare an uplink delay of each data packet of the VoIP service in a time period with an uplink delay threshold, and collect statistics of uplink delays of the VoIP service that are greater than or equal to the uplink delay threshold.

With reference to the second aspect, in a sixth possible implementation manner, the measurement module is configured to obtain an uplink jitter of the VoIP service according to a difference between uplink delays of any two data packets of the VoIP service in a time period.

With reference to the second aspect, in a seventh possible implementation manner, the measurement module is configured to determine the difference between the uplink delays of the any two data packets of the VoIP service according to times of receiving the any two data packets and times corresponding to RTP timestamps of the any two data packets.

With reference to the second aspect, in an eighth possible implementation manner, the measurement module is configured to perform averaging on all uplink jitters of the VoIP service in the time period, and obtain an average value of the uplink jitters of the VoIP service in the time period; or compare each uplink jitter of the VoIP service in the time period with an uplink jitter threshold, and collect statistics of uplink jitters of the VoIP service that are greater than or equal to the uplink delay threshold.

With reference to the second aspect, in a ninth possible implementation manner, the VoIP call drop information includes any one or a combination of the following parameters: a VoIP call count, a VoIP call drop count, and a VoIP call drop rate.

According to a third aspect of the present disclosure, an apparatus for obtaining a quality of service parameter of a VoIP service is provided and includes a processor, a memory, a bus, and a communications interface, where the memory is configured to store a computer-executable instruction, the processor is connected to the memory by the bus, and when the apparatus runs, the processor executes the computer-executable instruction stored in the memory, where the processor is configured to obtain a quality of service parameter of a VoIP service, where the quality of service parameter of the VoIP service includes at least one of the following: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling SPS resource utilization efficiency, or VoIP call drop information; and the communications interface is configured to send a quality parameter report of the VoIP service to a centralized processing device. The quality parameter report of the VoIP service includes the quality of service parameter of the VoIP service.

With reference to the third aspect, in a first possible implementation manner, the communications interface is further configured to receive, before the processor obtains the quality of service parameter of the VoIP service, an activation command message sent by the measurement trigger device, where the activation command message is used to instruct the processor to obtain the quality of service parameter of the VoIP service.

With reference to the third aspect, in a second possible implementation manner, the processor is configured to select, according to the activation command message, at least one UE for performing a measurement, and obtain the quality of service parameter of the VoIP service.

With reference to the third aspect, in a third possible implementation manner, the selecting at least one UE for performing a measurement needs to meet the following selection condition: whether the at least one UE performs the VoIP service; and/or whether the at least one UE agrees to provide a measurement service for the apparatus.

With reference to the third aspect, in a fourth possible implementation manner, the activation command message includes an identity of the at least one UE; and the processor is configured to measure the at least one corresponding UE according to the identity of the at least one UE, and obtain the quality of service parameter of the VoIP service of the at least one UE.

With reference to the third aspect, in a fifth possible implementation manner, the activation command message further includes quality of service parameter information that needs to be obtained, and the quality of service parameter information that needs to be obtained is used to represent any one or a combination of the following quality of service parameters: the VoIP service delay, the VoIP service jitter, the VoIP service encoding type, the VoIP service packet size, the VoIP service packet loss rate, the VoIP service encoding rate, the mean opinion value of the VoIP service, the VoIP signaling delay, the VoIP access failure information, the VoIP handover failure information, the SPS resource utilization efficiency, or the VoIP call drop information.

With reference to the third aspect, in a sixth possible implementation manner, the processor is further configured to determine, before obtaining the quality of service parameter of the VoIP service, whether the VoIP service meets a measurement condition; and if the VoIP service meets the measurement condition, the processor is configured to select at least one UE for performing a measurement, and obtain the quality of service parameter of the VoIP service.

With reference to the third aspect, in a seventh possible implementation manner, the VoIP access failure information includes any one or a combination of the following: the VoIP access failure information count, identity information of a corresponding serving cell during the VoIP access failure, corresponding time information during the VoIP access failure, reference signal quality or strength of a corresponding cell during the VoIP access failure, or transmit power information of the UE during the VoIP access failure.

With reference to the third aspect, in an eighth possible implementation manner, the VoIP handover failure information includes any one or a combination of the following: the VoIP handover failure count, reference signal quality or strength of a corresponding source cell and/or target cell during the VoIP handover failure, transmit power information of the UE during the VoIP handover failure, identity information of a corresponding source cell during the VoIP handover failure, or identity information of a corresponding target cell during the VoIP handover failure.

With reference to the third aspect, in a ninth possible implementation manner, the VoIP service delay includes an uplink delay of the VoIP service and/or a downlink delay of the VoIP service; and the VoIP service jitter includes an uplink jitter of the VoIP service and/or a downlink jitter of the VoIP service.

With reference to the third aspect, in a tenth possible implementation manner, the processor is configured to obtain a downlink delay of a data packet of the VoIP service according to a first time and a second time, where the first time is a time of receiving an acknowledgment message of a last segment of the data packet, and the second time is a time of arrival of the data packet at a PDCP layer of the apparatus.

With reference to the third aspect, in an eleventh possible implementation manner, the processor is configured to perform averaging on downlink delays of all the data packets of the VoIP service in a time period, and obtain an average value of the downlink delays of the VoIP service in the time period; or compare a downlink delay of each data packet of the VoIP service in a time period with a downlink delay threshold, and collect statistics of downlink delays of the data packets of the VoIP service that are greater than or equal to the downlink delay threshold.

With reference to the third aspect, in a twelfth possible implementation manner, the processor is configured to obtain a downlink jitter of the VoIP service according to a difference between downlink delays of any two data packets of the VoIP service in a time period.

With reference to the third aspect, in a thirteenth possible implementation manner, the processor is configured to perform averaging on all downlink jitters of the VoIP service in the time period, and obtain an average value of the downlink delays of the VoIP service in the time period; or compare each downlink jitter of the VoIP service in the time period with a downlink jitter threshold, and collect statistics of downlink jitters of the VoIP service that are greater than or equal to the downlink jitter threshold.

With reference to the third aspect, in a fourteenth possible implementation manner, the processor is configured to obtain an uplink delay of a first data packet of the VoIP service according to a difference between an acknowledgement time and an arrival time, where the acknowledgement time is a time of sending an acknowledgement message of a last segment of the first data packet to the UE, and the arrival time is a time of receiving a scheduling request corresponding to the first data packet; and obtain an uplink delay of any other data packet of the VoIP service according to the uplink delay of the first data packet of the VoIP service and an RTP timestamp of the first data packet.

With reference to the third aspect, in a fifteenth possible implementation manner, the processor is configured to obtain a first uplink delay of a data packet of the VoIP service according to a difference between a third time and a fourth time, where the third time is a time of receiving the data packet, and the fourth time is a time corresponding to an RTP timestamp of the data packet; obtain a delay set including delays of all the data packets in a time period, where the delay set includes first uplink delays of all the data packets of the VoIP service; obtain a first data packet having a shortest first delay in the delay set, as a reference data packet for delay calculation; and obtain an uplink delay of any other data packet of the VoIP service according to the corresponding uplink delay of the first data packet.

With reference to the third aspect, in a sixteenth possible implementation manner, the communications interface is further configured to receive, before the processor obtains the quality of service parameter of the VoIP service, a timestamp value reported by the at least one UE; the processor is further configured to obtain a correspondence between a network time and the UE-side time according to the timestamp value; and the processor is configured to obtain, according to the correspondence between the network time and the UE-side time, a first network time corresponding to a time of sending a first data packet, obtain a second network time corresponding to a time of acknowledging reception of the first data packet, and obtain an uplink delay of the first data packet of the VoIP service according to the first network time and the second network time.

With reference to the third aspect, in a seventeenth possible implementation manner, the processor is configured to obtain a data packet sent by the at least one UE, where the data packet carries a sending timestamp, and a correspondence exists between the sending timestamp and a network time of the apparatus; and obtain, according to the correspondence, the network time corresponding to the sending timestamp, and calculate an uplink delay of the data packet of the VoIP service according to the network time corresponding to the sending timestamp.

With reference to the third aspect, in an eighteenth possible implementation manner, the processor is configured to perform averaging on uplink delays of all the data packets of the VoIP service in the time period, and obtain an average value of the uplink delays of the VoIP service in the time period; or compare an uplink delay of each data packet of the VoIP service in the time period with an uplink delay threshold, and collect statistics of downlink delays of the VoIP service that are greater than or equal to the uplink delay threshold.

With reference to the third aspect, in a nineteenth possible implementation manner, the processor is configured to obtain an uplink jitter of the VoIP service according to a difference between uplink delays of any two data packets of the VoIP service in a time period.

With reference to the third aspect, in a twentieth possible implementation manner, the processor is configured to determine the difference between the uplink delays of the any two data packets of the VoIP service according to times of receiving the any two data packets and times corresponding to RTP timestamps of the any two data packets.

With reference to the third aspect, in a twenty-first possible implementation manner, the processor is configured to perform averaging on all uplink jitters of the VoIP service in the time period, and obtain an average value of the uplink jitters of the VoIP service in the time period; or compare each uplink jitter of the VoIP service in the time period with an uplink jitter threshold, and collect statistics of uplink jitters of the VoIP service that are greater than or equal to the uplink delay threshold.

With reference to the third aspect, in a twenty-second possible implementation manner, the communications interface is further configured to send a VoIP service measurement instruction message to at least one UE, where the VoIP service measurement instruction message instructs the UE to measure quality of service parameter information of the VoIP service, and the quality of service parameter information of the VoIP service is used to represent any one or a combination of the following parameters: the VoIP service delay, the VoIP service jitter, the VoIP service encoding type, the VoIP service packet loss rate, the VoIP service encoding rate, the mean opinion value of the VoIP service, the VoIP signaling delay, the VoIP access failure information, the VoIP handover failure information, the SPS resource utilization efficiency, or the VoIP call drop information; and the communications interface is further configured to receive a VoIP service measurement record report message sent by the at least one UE, where the VoIP service measurement record report message includes the quality of service parameter.

With reference to the third aspect, in a twenty-third possible implementation manner, the VoIP call drop information includes any one or a combination of the following parameters: a VoIP call count, a VoIP call drop count, and a VoIP call drop rate.

According to a fourth aspect of the present disclosure, an apparatus for obtaining a quality of service parameter of a VoIP service is provided and includes a processor, a memory, a bus, and a communications interface, where the memory is configured to store a computer-executable instruction, the processor is connected to the memory by the bus, and when the apparatus runs, the processor executes the computer-executable instruction stored in the memory, where the communications interface is configured to receive a VoIP service measurement instruction message sent by a wireless access device, where the VoIP service measurement instruction message instructs the processor to measure quality of service parameter information of a VoIP service, and the quality of service parameter information of the VoIP service is used to represent any one or a combination of the following quality of service parameters: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, SPS resource utilization efficiency, or VoIP call drop information; and further configured to send a VoIP service measurement record report message to the wireless access device, where the VoIP service measurement record report message includes the quality of service parameter; and the processor is configured to perform a measurement to obtain the quality of service parameter.

With reference to the fourth aspect, in a first possible implementation manner, the VoIP access failure information includes any one or a combination of the following: the VoIP access failure information count, identity information of a corresponding serving cell during the VoIP access failure, corresponding time information during the VoIP access failure, identity information of a corresponding serving cell during the VoIP access failure, reference signal quality or strength of a corresponding cell during the VoIP access failure, or transmit power information of UE during the VoIP access failure.

With reference to the fourth aspect, in a second possible implementation manner, the VoIP handover failure information includes any one or a combination of the following: the VoIP handover failure count, reference signal quality or strength of a corresponding source cell or target cell during the VoIP handover failure, transmit power information of UE during the VoIP handover failure, identity information of a corresponding source cell during the VoIP handover failure, or identity information of a corresponding target cell during the VoIP handover failure.

With reference to the fourth aspect, in a third possible implementation manner, the VoIP service delay includes an uplink delay of the VoIP service; and the VoIP service jitter includes an uplink jitter of the VoIP service.

With reference to the fourth aspect, in a fourth possible implementation manner, the processor is configured to obtain an uplink delay of a data packet of the VoIP service according to a difference between a time of receiving an acknowledgement and a time of generating the data packet, where the time of receiving the acknowledgement is a time at which the communications interface receives an acknowledgement message sent by the wireless access device for a last segment of the data packet, and the time of generating the data packet is a time at which the UE generates the data packet.

With reference to the fourth aspect, in a fifth possible implementation manner, the processor is configured to perform averaging on uplink delays of all the data packets of the VoIP service in a time period, and obtain an average value of the uplink delays of the VoIP service in the time period; or compare an uplink delay of each data packet of the VoIP service in a time period with an uplink delay threshold, and collect statistics of uplink delays of the VoIP service that are greater than or equal to the uplink delay threshold.

With reference to the fourth aspect, in a sixth possible implementation manner, the processor is configured to obtain an uplink jitter of the VoIP service according to a difference between uplink delays of any two data packets of the VoIP service in a time period.

With reference to the fourth aspect, in a seventh possible implementation manner, the processor is configured to determine the difference between the uplink delays of the any two data packets of the VoIP service according to times of receiving the any two data packets and times corresponding to RTP timestamps of the any two data packets.

With reference to the fourth aspect, in an eighth possible implementation manner, the processor is configured to perform averaging on all uplink jitters of the VoIP service in the time period, and obtain an average value of the uplink jitters of the VoIP service in the time period; or compare each uplink jitter of the VoIP service in the time period with an uplink jitter threshold, and collect statistics of uplink jitters of the VoIP service that are greater than or equal to the uplink delay threshold.

With reference to the fourth aspect, in a ninth possible implementation manner, the VoIP call drop information includes any one or a combination of the following parameters: a VoIP call count, a VoIP call drop count, and a VoIP call drop rate.

According to a fifth aspect of the present disclosure, a system for obtaining a quality of service parameter of a VoIP service is provided and includes at least one apparatus for obtaining a quality of service parameter of a VoIP service according to any one of the first aspect or feasible implementation manners of the first aspect and at least one apparatus for obtaining a quality of service parameter of a VoIP service according to any one of the second aspect or feasible implementation manners of the second aspect; or at least one apparatus for obtaining a quality of service parameter of a VoIP service according to any one of the third aspect or feasible implementation manners of the third aspect and at least one apparatus for obtaining a quality of service parameter of a VoIP service according to any one of the fourth aspect or feasible implementation manners of the fourth aspect.

With reference to the fifth aspect, in a first possible implementation manner, the system further includes a centralized processing device, where the centralized processing device is configured to receive a quality parameter report of a VoIP service sent by the apparatus for obtaining a quality of service parameter of a VoIP service according to any one of the first aspect or feasible implementation manners of the first aspect or the apparatus for obtaining a quality of service parameter of a VoIP service according to any one of the third aspect or feasible implementation manners of the third aspect.

According to a sixth aspect of the present disclosure, a method for obtaining a quality of service parameter of a VoIP service is provided and includes obtaining, by a wireless access device, a quality of service parameter of a VoIP service, where the quality of service parameter of the VoIP service includes at least one of the following: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling SPS resource utilization efficiency, or VoIP call drop information; and sending, by the wireless access device, a quality parameter report of the VoIP service to a centralized processing device. The quality parameter report of the VoIP service includes the quality of service parameter of the VoIP service.

With reference to the sixth aspect, in a first possible implementation manner, before the obtaining, by a wireless access device, a quality of service parameter of a VoIP service, the method includes receiving, by the wireless access device, an activation command message sent by the measurement trigger device, where the activation command message is used to instruct the wireless access device to obtain the quality of service parameter of the VoIP service.

With reference to the sixth aspect, in a second possible implementation manner, the obtaining, by a wireless access device, a quality of service parameter of a VoIP service, includes selecting, by the wireless access device according to the activation command message, at least one UE for performing a measurement, and obtaining the quality of service parameter of the VoIP service.

With reference to the sixth aspect, in a third possible implementation manner, the selecting at least one UE for performing a measurement needs to meet the following selection condition: whether the at least one UE performs the VoIP service; and/or whether the at least one UE agrees to provide a measurement service for the wireless access device.

With reference to the sixth aspect, in a fourth possible implementation manner, the activation command message includes an identity of the at least one UE; and the obtaining, by a wireless access device, a quality of service parameter of a VoIP service, includes measuring, by the wireless access device, the at least one corresponding UE according to the identity of the at least one UE, and obtaining the quality of service parameter of the VoIP service of the at least one UE.

With reference to the sixth aspect, in a fifth possible implementation manner, the activation command message further includes quality of service parameter information that needs to be obtained, and the quality of service parameter information that needs to be obtained is used to represent any one or a combination of the following quality of service parameters: the VoIP service delay, the VoIP service jitter, the VoIP service encoding type, the VoIP service packet size, the VoIP service packet loss rate, the VoIP service encoding rate, the mean opinion value of the VoIP service, the VoIP signaling delay, the VoIP access failure information, the VoIP handover failure information, the SPS resource utilization efficiency, or the VoIP call drop information.

With reference to the sixth aspect, in a sixth possible implementation manner, before the obtaining, by a wireless access device, a quality of service parameter of a VoIP service, the method includes determining, by the wireless access device, whether the VoIP service meets a measurement condition; and the obtaining, by a wireless access device, a quality of service parameter of a VoIP service, includes, if the VoIP service meets the measurement condition, selecting, by the wireless access device, at least one UE for performing a measurement, and obtaining the quality of service parameter of the VoIP service.

With reference to the sixth aspect, in a seventh possible implementation manner, the VoIP access failure information includes any one or a combination of the following: the VoIP access failure information count, identity information of a corresponding serving cell during the VoIP access failure, corresponding time information during the VoIP access failure, reference signal quality or strength of a corresponding cell during the VoIP access failure, or transmit power information of the UE during the VoIP access failure.

With reference to the sixth aspect, in an eighth possible implementation manner, the VoIP handover failure information includes any one or a combination of the following: the VoIP handover failure count, reference signal quality or strength of a corresponding source cell and/or target cell during the VoIP handover failure, transmit power information of the UE during the VoIP handover failure, identity information of a corresponding source cell during the VoIP handover failure, or identity information of a corresponding target cell during the VoIP handover failure.

With reference to the sixth aspect, in a ninth possible implementation manner, the VoIP service delay includes an uplink delay of the VoIP service and/or a downlink delay of the VoIP service; and the VoIP service jitter includes an uplink jitter of the VoIP service and/or a downlink jitter of the VoIP service.

With reference to the sixth aspect, in a tenth possible implementation manner, a downlink delay of the VoIP service is obtained in the following manner: the wireless access device obtains a downlink delay of a data packet of the VoIP service according to a first time and a second time, where the first time is a time at which the wireless access device receives an acknowledgement message of a last segment of the data packet, and the second time is a time of arrival of the data packet at a PDCP layer of the wireless access device.

With reference to the sixth aspect, in an eleventh possible implementation manner, downlink delays of the VoIP service are summarized in the following manner: the wireless access device performs averaging on downlink delays of all the data packets of the VoIP service in a time period, and obtains an average value of the downlink delays of the VoIP service in the time period; or the wireless access device compares a downlink delay of each data packet of the VoIP service in a time period with a downlink delay threshold, and collects statistics of downlink delays of the data packets of the VoIP service that are greater than or equal to the downlink delay threshold.

With reference to the sixth aspect, in a twelfth possible implementation manner, the wireless access device obtains a downlink jitter of the VoIP service according to a difference between downlink delays of any two data packets of the VoIP service in a time period.

With reference to the sixth aspect, in a thirteenth possible implementation manner, downlink jitters of the VoIP service are summarized in the following manner: the wireless access device performs averaging on all downlink jitters of the VoIP service in the time period, and obtains an average value of the downlink delays of the VoIP service in the time period; or the wireless access device compares each downlink jitter of the VoIP service in the time period with a downlink jitter threshold, and collects statistics of downlink jitters of the VoIP service that are greater than or equal to the downlink jitter threshold.

With reference to the sixth aspect, in a fourteenth possible implementation manner, an uplink delay of the VoIP service is obtained in the following manner: the wireless access device obtains an uplink delay of a first data packet of the VoIP service according to a difference between an acknowledgement time and an arrival time, where the acknowledgement time is a time of sending an acknowledgement message of a last segment of the first data packet to the UE, and the arrival time is a time of receiving a scheduling request corresponding to the first data packet; and the wireless access device obtains an uplink delay of any other data packet of the VoIP service according to the uplink delay of the first data packet of the VoIP service and an RTP timestamp of the first data packet.

With reference to the sixth aspect, in a fifteenth possible implementation manner, an uplink delay of the VoIP service is obtained in the following manner: the wireless access device obtains a first uplink delay of a data packet of the VoIP service according to a difference between a third time and a fourth time, where the third time is a time at which the wireless access device receives the data packet, and the fourth time is a time corresponding to an RTP timestamp of the data packet; the wireless access device obtains a delay set including delays of all the data packets in a time period, where the delay set includes first uplink delays of all the data packets of the VoIP service; the wireless access device obtains a first data packet having a shortest first delay in the delay set, as a reference data packet for delay calculation; and the wireless access device obtains an uplink delay of any other data packet of the VoIP service according to the corresponding uplink delay of the first data packet.

With reference to the sixth aspect, in a sixteenth possible implementation manner, before the obtaining, by a wireless access device, a quality of service parameter of a VoIP service, the method further includes receiving, by the wireless access device, a timestamp value reported by the at least one UE; and obtaining a correspondence between a network time and the UE-side time according to the timestamp value; and an uplink delay of the VoIP service is obtained in the following manner: the wireless access device obtains, according to the correspondence between the network time and the UE-side time, a first network time corresponding to a time of sending a first data packet, obtains a second network time corresponding to a time at which the wireless access device acknowledges reception of the first data packet, and obtains an uplink delay of the first data packet of the VoIP service according to the first network time and the second network time.

With reference to the sixth aspect, in a seventeenth possible implementation manner, an uplink delay of the VoIP service is obtained in the following manner: the wireless access device obtains a data packet sent by the at least one UE, where the data packet carries a sending timestamp, and a correspondence exists between the sending timestamp and a network time of the wireless access device; and the wireless access device obtains, according to the correspondence, the network time corresponding to the sending timestamp, and calculates an uplink delay of the data packet of the VoIP service according to the network time corresponding to the sending timestamp.

With reference to the sixth aspect, in an eighteenth possible implementation manner, uplink delays of the VoIP service are summarized in the following manner: the wireless access device performs averaging on uplink delays of all the data packets of the VoIP service in the time period, and obtains an average value of the uplink delays of the VoIP service in the time period; or the wireless access device compares an uplink delay of each data packet of the VoIP service in the time period with an uplink delay threshold, and collects statistics of downlink delays of the VoIP service that are greater than or equal to the uplink delay threshold.

With reference to the sixth aspect, in a nineteenth possible implementation manner, the wireless access device obtains an uplink jitter of the VoIP service according to a difference between uplink delays of any two data packets of the VoIP service in a time period.

With reference to the sixth aspect, in a twentieth possible implementation manner, the wireless access device determines the difference between the uplink delays of the any two data packets of the VoIP service according to times of receiving the any two data packets and times corresponding to RTP timestamps of the any two data packets.

With reference to the sixth aspect, in a twenty-first possible implementation manner, uplink jitters of the VoIP service are summarized in the following manner: the wireless access device performs averaging on all uplink jitters of the VoIP service in the time period, and obtains an average value of the uplink jitters of the VoIP service in the time period; or the wireless access device compares each uplink jitter of the VoIP service in the time period with an uplink jitter threshold, and collects statistics of uplink jitters of the VoIP service that are greater than or equal to the uplink delay threshold.

With reference to the sixth aspect, in a twenty-second possible implementation manner, the obtaining, by a wireless access device, a quality of service parameter of a VoIP service, includes sending, by the wireless access device, a VoIP service measurement instruction message to at least one UE, where the VoIP service measurement instruction message instructs the UE to measure quality of service parameter information of the VoIP service, and the quality of service parameter information of the VoIP service is used to represent any one or a combination of the following parameters: the VoIP service delay, the VoIP service jitter, the VoIP service encoding type, the VoIP service packet loss rate, the VoIP service encoding rate, the mean opinion value of the VoIP service, the VoIP signaling delay, the VoIP access failure information, the VoIP handover failure information, the SPS resource utilization efficiency, or the VoIP call drop information; and receiving, by the wireless access device, a VoIP service measurement record report message sent by the at least one UE, where the VoIP service measurement record report message includes the quality of service parameter.

With reference to the sixth aspect, in a twenty-third possible implementation manner, the VoIP call drop information includes any one or a combination of the following parameters: a VoIP call count, a VoIP call drop count, and a VoIP call drop rate.

According to a seventh aspect of the present disclosure, a method for obtaining a quality of service parameter of a VoIP service is provided and includes receiving, by UE, a VoIP service measurement instruction message sent by a wireless access device, where the VoIP service measurement instruction message instructs the user equipment to measure quality of service parameter information of a VoIP service, and the quality of service parameter information of the VoIP service is used to represent any one or a combination of the following quality of service parameters: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, SPS resource utilization efficiency, or VoIP call drop information; performing, by the UE, a measurement to obtain the quality of service parameter; and sending, by the UE, a VoIP service measurement record report message to the wireless access device, where the VoIP service measurement record report message includes the quality of service parameter.

With reference to the seventh aspect, in a first possible implementation manner, the VoIP access failure information includes any one or a combination of the following: the VoIP access failure information count, identity information of a corresponding serving cell during the VoIP access failure, corresponding time information during the VoIP access failure, identity information of a corresponding serving cell during the VoIP access failure, reference signal quality or strength of a corresponding cell during the VoIP access failure, or transmit power information of the UE during the VoIP access failure.

With reference to the seventh aspect, in a second possible implementation manner, the VoIP handover failure information includes any one or a combination of the following: the VoIP handover failure count, reference signal quality or strength of a corresponding source cell or target cell during the VoIP handover failure, transmit power information of the UE during the VoIP handover failure, identity information of a corresponding source cell during the VoIP handover failure, or identity information of a corresponding target cell during the VoIP handover failure.

With reference to the seventh aspect, in a third possible implementation manner, the VoIP service delay includes an uplink delay of the VoIP service; and the VoIP service jitter includes an uplink jitter of the VoIP service.

With reference to the seventh aspect, in a fourth possible implementation manner, an uplink delay of the VoIP service is obtained in the following manner: the UE obtains an uplink delay of a data packet of the VoIP service according to a difference between a time of receiving an acknowledgement and a time of generating the data packet, where the time of receiving the acknowledgement is a time at which the UE receives an acknowledgement message sent by the wireless access device for a last segment of the data packet, and the time of generating the data packet is a time at which the UE generates the data packet.

With reference to the seventh aspect, in a fifth possible implementation manner, uplink delays of the VoIP service are summarized in the following manner: the UE performs averaging on uplink delays of all the data packets of the VoIP service in a time period, and obtains an average value of the uplink delays of the VoIP service in the time period; or the UE compares an uplink delay of each data packet of the VoIP service in a time period with an uplink delay threshold, and collects statistics of uplink delays of the VoIP service that are greater than or equal to the uplink delay threshold.

With reference to the seventh aspect, in a sixth possible implementation manner, the UE obtains an uplink jitter of the VoIP service according to a difference between uplink delays of any two data packets of the VoIP service in the time period.

With reference to the seventh aspect, in a seventh possible implementation manner, the method further includes determining the difference between the uplink delays of the any two data packets of the VoIP service according to times of receiving the any two data packets and times corresponding to RTP timestamps of the any two data packets.

With reference to the seventh aspect, in an eighth possible implementation manner, uplink jitters of the VoIP service are summarized in the following manner: the UE performs averaging on all uplink jitters of the VoIP service in the time period, and obtains an average value of the uplink jitters of the VoIP service in the time period; or the UE compares each uplink jitter of the VoIP service in the time period with an uplink jitter threshold, and collects statistics of uplink jitters of the VoIP service that are greater than or equal to the uplink delay threshold.

With reference to the seventh aspect, in a ninth possible implementation manner, the VoIP call drop information includes any one or a combination of the following parameters: a VoIP call count, a VoIP call drop count, and a VoIP call drop rate.

The embodiments provide an apparatus, a system, and a method for obtaining a quality of service parameter of a VoIP service. The apparatus obtains a quality of service parameter of a VoIP service, and the apparatus sends a quality parameter report of the VoIP service to a centralized processing device. The quality parameter report of the VoIP service includes the quality of service parameter of the VoIP service, so that a network system obtains quality of service of the VoIP service according to the quality of service parameter of the VoIP service, further helping an operator control and adjust the network system based on the quality of service of the VoIP service.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A VoIP service is initially applied to a fixed network, and main modes of the VoIP service include IP toll call and peer-to-peer (PTP) communication (such as Skype®). With continuous evolution of a wireless network, in a Long Term Evolution (LTE) system, an all-IP architecture is already implemented, and no circuit switched (CS) domain exists any longer. However, a voice service is still a basic service in mobile communications. Therefore, VoIP service applied to LTE come into our sight. In a narrow sense, the VoIP service is a voice over IP service. However, in a broad sense, the VoIP service is not merely so, and may further bear other multimedia services, such as a video call and instant messaging. These applications are hard to implement in a CS domain, but are easy to implement if based on an IP bearer. In a word, VoIP can bring service flexibility, simplify a network architecture, and reduce management costs. In addition, using the IP bearer, statistical multiplexing of data can be performed in a transmission network. In comparison with use of a dedicated link in the CS domain, transmission efficiency is improved.

After VoIP is deployed, an operator is concerned about quality of a VoIP service provided for a user, so as to perform network optimization, and about how the operator can obtain actual quality of service related to the VoIP service.

Figure 1:
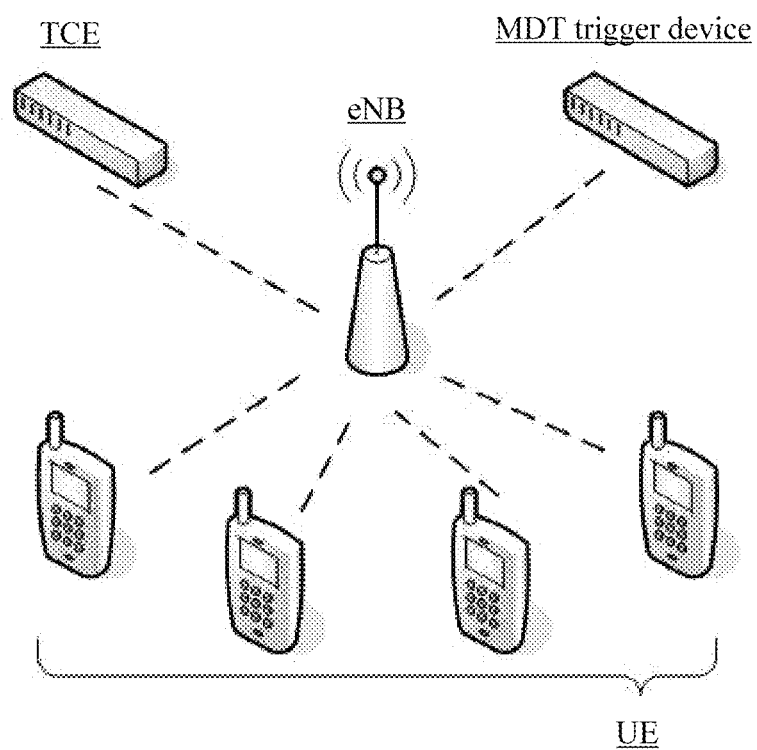
FIG. 1 is a schematic structural diagram of a network system.

To obtain the actual quality of service related to the VoIP service, a MDT technology may be used to obtain a quality of service parameter related to the VoIP service. FIG. 1 is a schematic structural diagram of a network system. Referring to FIG. 1, the system includes an MDT trigger device, an eNodeB (eNB), UE, and an MDT result collection device [for example, the MDT result collection device may be trace collection equipment (TCE)]. Network maintenance and optimization personnel analyze and compare measurement results collected by the TCE to determine whether VoIP meets a requirement of user perception, and if the requirement is not met, determines which problem exists and how to perform optimization. The TCE is a logical device, and may be deployed independently as separate hardware, or may be integrated in a core network device, or is integrated and deployed on an operation management (OM) device.

The MDT trigger device is configured to trigger an MDT process.

A condition for triggering the MDT process by the MDT trigger device may be active triggering by the operator or may be triggering by the MDT trigger device according to a status of the network system. The MDT trigger device may be a network management unit, or may be a core network device.

The eNB is configured to perform an MDT measurement, or select corresponding UE to perform an MDT measurement and collect measurement parameters reported by the UE.

The UE is configured to perform an MDT measurement according to an instruction of the eNB.

In addition, a quantity of UEs that perform the MDT measurement is determined according to a requirement of the MDT measurement and an actual quantity of UEs in the network, as long as precision of the MDT measurement can be met.

The TCE is configured to collect a quality of service parameter of the VoIP service reported by the eNB.

It should be noted that, in FIG. 1, quantities of MDT trigger devices, eNBs, UEs, and TCEs are only examples. The eNB may be further replaced with other devices, for example, a relay node (Relay), a repeater, or a Device to Device Communication (D2D) device.

Figure 2:
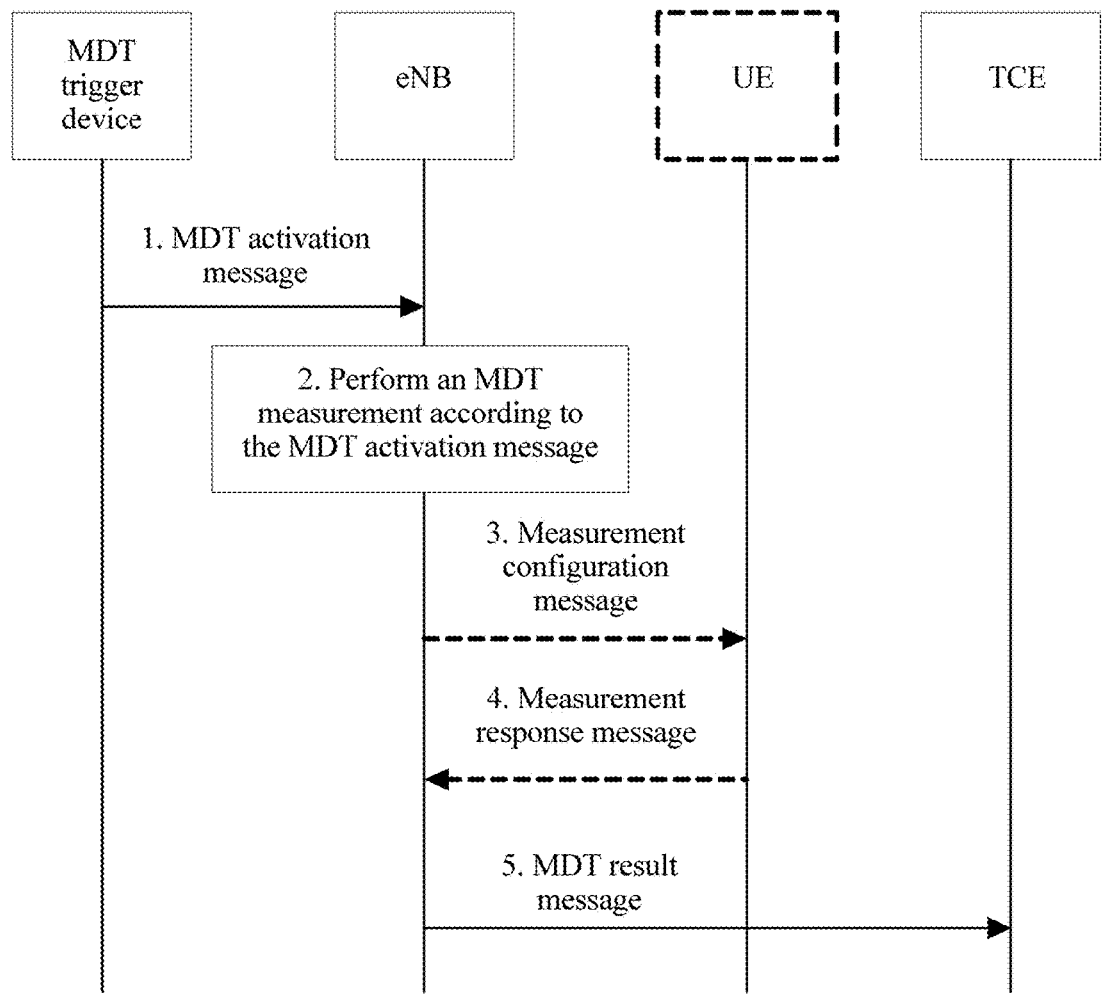
FIG. 2 is a schematic flowchart of interaction in minimization of drive test (MDT)

FIG. 2 is a schematic flowchart of interaction in MDT. Referring to FIG. 2, the interaction includes the following steps.

Step 1: An MDT trigger device sends an MDT activation message to an eNB.

The MDT activation message includes a trace reference (TR) and an IP address of TCE.

Step 2: The eNB performs an MDT measurement according to the MDT activation message.

Optionally, for a solution in which UE needs to perform an MDT measurement, the interaction may further include the following step 3 and step 4.

Step 3: The eNB sends a measurement configuration message to UE.

It should be noted that, before the eNB sends the measurement configuration message to the UE, the eNB needs to select UE that meets a measurement condition. There may be one or more UEs. If there are multiple UEs, the eNB needs to send the configuration message to each UE.

Step 4: The UE reports a measurement response message to the eNB, where the measurement response message includes a measurement record.

The measurement record includes a measurement result recorded by the UE. The measurement record may be reported to the eNB that initiates the measurement configuration, or may be reported to another eNB. For example, the UE receives a measurement configuration message from a first eNB, performs a measurement and saves a measurement result, and then moves to a coverage area of a second eNB, and reports the measurement result to the second eNB.

Step 5: The eNB sends an MDT result message to the TCE.

The MDT result message includes a measurement parameter.

The following embodiments of the present disclosure provide a method, an apparatus, and a system for obtaining a quality of service parameter of a VoIP service, so as to obtain a quality of service parameter of a VoIP service using the network system structure and interaction procedure provided in FIG. 1 and FIG. 2. Certainly, the following embodiments of the present disclosure are not limited to use of the MDT technology to obtain a quality of service parameter of a VoIP service. Use of other interaction means to obtain a quality of service parameter of a VoIP service shall also fall within the scope of the embodiments of the present disclosure.

Figure 3:
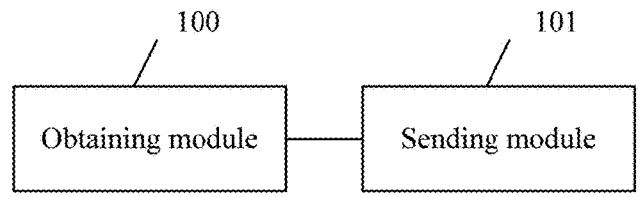
FIG. 3 is a schematic structural diagram of an apparatus for obtaining a quality of service parameter of a VoIP service according to an embodiment of the present disclosure.

FIG. 3 is a schematic structural diagram of an apparatus for obtaining a quality of service parameter of a VoIP service according to an embodiment of the present disclosure. The apparatus for obtaining a quality of service parameter of a VoIP service may be a wireless access device that has a function of obtaining a quality of service parameter of a VoIP service. Unless in special cases, a wireless access device is used as an example hereinafter. Further, the apparatus for obtaining a quality of service parameter of a VoIP service may be installed as a physical device on the wireless access device, or the apparatus is integrated in the wireless access device. The wireless access device may be a base station, a relay node, a repeater, a D2D device, or the like. Referring to FIG. 3, the wireless access device includes an obtaining module 100 and a sending module 101.

The obtaining module 100 is configured to obtain a quality of service parameter of a VoIP service. The quality of service parameter of the VoIP service includes at least one of the following: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling SPS resource utilization efficiency, or VoIP call drop information.

The quality of service parameter of the VoIP service includes at least one of the following: a VoIP service delay, a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, or semi-persistent scheduling (SPS) resource utilization efficiency.

VoIP service delay: An end-to-end delay is one of the most important factors that affect quality of interactive voice communication. The end-to-end delay must be controlled within an appropriate value. Otherwise, a listening party misunderstands that a speaking party does not start to speak, and therefore speaks. However, if a conversation of the other party arrives due to the VoIP service delay at this time, a voice collision occurs between the two parties in the call (For example, during a QQ video, sometimes a long delay and an echo occur; one party already starts to speak, but an echo is received after a time interval; the other party also hears the voice at a corresponding time. Therefore, the delay affects voice perception greatly).

VoIP service packet loss rate: In a network, there are mainly two packet loss cases. One is that packets are lost randomly, and when a collision occurs in the network, one or two data packets are lost occasionally. The other is a burst packet loss, which means that at least one data packet is lost continuously, and voice quality of the VoIP service is obviously affected.

VoIP service jitter: It is a time difference of arrival of all sent data packets in an IP call process. When a data packet is sent, a transmit end adds a timestamp to an RTP packet header. When the data packet is received at the other end, a receive end also adds another timestamp. A channel transmission time of the data packet may be obtained by calculating the two timestamps. If a call includes different channel transmission times, a jitter exists. In the call, an effect presented by the VoIP jitter is similar to an effect generated by a packet loss, and some letters or words are incorrect or are heard unclearly. A value of the jitter depends on a difference between channel transmission times of data packets. If the difference is greater, the jitter is also greater.

It should be noted that, a second 32 Bit of an RTP packet header is a timestamp of an RTP packet, and occupies 32 bits. The timestamp reflects a sampling time of a first byte of data in the RTP packet. An initial value of a timestamp at the beginning of a session is also selected randomly. Even if no signal is sent, a numeric value of the timestamp increases continuously as the time elapses. By using the timestamp, the receive end may accurately know when to restore which data block, and therefore eliminate a jitter in transmission. The timestamp may be further used to synchronize voices and images in a video application.

VoIP signaling delay: It is mainly used to collect statistics of transmission delays of VoIP signaling, and used to diagnose problems of too long call delays, including a VoIP call setup delay and a VoIP handover delay. VoIP access failure: It is mainly used to collect statistics of failures when a user initiates VoIP access, and used to diagnose problems of call failures. VoIP handover failure: It is mainly used to collect statistics of problems of handover failures when the user performing the VoIP service is handed over.

VoIP service encoding type: Currently, the Third Generation Partnership Project (3GPP) specifies that voice encoding formats are adaptive multi-rate (AMR) and adaptive multi-rate adaptive multi-rate wideband (AMR-WB). AMR-WB is AMR wideband, and its meaning is relative to adaptive multi-rate adaptive multi-rate narrowband (AMR-NB) (namely, AMR). AMR-WB emerges with emergence of a broadband network and higher auditory requirements of users.

VoIP call drop information: It is used to collect statistics of call drops of the user in the process of performing the VoIP service.

The sending module 101 is configured to send a quality parameter report of the VoIP service to a centralized processing device. The quality parameter report of the VoIP service includes the quality of service parameter of the VoIP service.

In the apparatus for obtaining a quality of service parameter of a VoIP service according to this embodiment, an obtaining module obtains a quality of service parameter of a VoIP service, and a sending module sends a quality parameter report of the VoIP service to a centralized processing device. The quality parameter report of the VoIP service includes the quality of service parameter of the VoIP service, so that a network system obtains quality of service of the VoIP service according to the quality of service parameter of the VoIP service, further helping an operator control and adjust the network system based on the quality of service of the VoIP service.

Further, the foregoing parameter measurement performed by the wireless access device may be implemented in the following manner.

VoIP service packet size: It collects statistics of sizes of voice packets received at a PDCP layer.

VoIP service packet loss rate: It collects statistics of a total quantity of VoIP packets arriving at an eNB in a time period, and a total quantity of VoIP packets successfully sent by the eNB to UE. A packet loss rate calculated according to the two total quantities is a total quantity of unsuccessfully sent data packets divided by a total quantity of VoIP packets that arrive.

VoIP service encoding rate: It measures an encoding rate corresponding to each VoIP service, and then further measures a total amount of data in packets corresponding to each encoding rate in the time period.

Mean opinion value of the VoIP service: The mean opinion value (MOS) is an evaluation value of subjective perception of the user on voice quality, and may be obtained according to a delay, a jitter, and a packet loss.

VoIP signaling delay: A signaling delay includes a call setup delay or a handover delay. For the call setup delay, a time from receiving a VoIP service request by the wireless access device to sending a VoIP service request acknowledgement is measured, and the call setup delay of the user is calculated. A time of receiving the VoIP service request may be a time of arrival of the VoIP service request at the wireless access device, or a time of receiving an access layer access indication triggered by an access layer of the UE for sending the VoIP service request. A time of sending the VoIP service request acknowledgement is a time of sending a VoIP service setup acknowledgement message, or a time of sending, to the access layer of the UE, a bearer setup command for setting up a radio bearer for the VoIP service. For the handover delay, a time from starting a handover by the wireless access device to completion of the handover is measured, and a user handover delay is calculated. A specific time of starting the handover is a time of sending a radio bearer reconfiguration command including a handover command to the UE, or a time of receiving a handover request. A time of completion of the handover is a time of receiving context release signaling sent by a handover target cell, or a time of receiving a handover complete command reported by the UE, or a time of receiving a first data packet sent by the UE to a target cell.

VoIP access failure information: It collects statistics of access attempts in which a VoIP access request is received but no VoIP call is set up successfully.

VoIP handover failure information: It records and collects statistics of handover failures of the UE performing the VoIP service.

SPS resource utilization efficiency: SPS scheduling is generally used for VoIP when the wireless access device performs scheduling. The SPS scheduling refers to reserving a certain resource according to an interval of arrival of a voice packet, so that the UE directly performs data transmission on the corresponding resource instead of waiting for scheduling by the network every time. However, a voice packet is not generated exactly in a resource position reserved every time. Therefore, utilization efficiency of the SPS resource may be calculated according to a quantity of times that the SPS resource is actually used in a time period. A network administrator may measure, according to the efficiency, whether the SPS resource configured in the network is appropriate.

VoIP call drop information: It includes a VoIP call count, a VoIP call drop count, and a VoIP call drop rate, and is used to collect statistics of call drops of the user in the process of performing the VoIP service.

A method for collecting statistics of VoIP call drop information may be implemented in the following manner.

Method for collecting statistics on a wireless access network device side: The wireless access network device determines, according to a quality of service class identifier (QCI) in a received service setup command, whether an established service is a VoIP service. For example, if the QCI in the service setup command received by the wireless access network device is equal to 1, the wireless access network device considers that the service established at this time is a VoIP service. Statistics of multiple established VoIP services are collected, and a call drop rate is calculated. A specific call drop is reflected on the network side as follows: A radio link failure (RLF) occurs on the UE performing the VoIP service or the access network device cannot receive a channel quality indicator (CQI) reported by the UE, or the wireless access network device cannot receive a sounding reference signal (SRS) signal of the UE, or a radio link control (RLC) layer of the wireless access network device cannot receive an acknowledgement, and the RLC layer of the wireless access network device is reset. The wireless access network device collects statistics of multiple VoIP calls of multiple UEs, then records VoIP call drops, and divides the VoIP call drop count by a total quantity of VoIP calls to calculate a call drop rate.

Method for collecting statistics on a UE side: The UE collects statistics of VoIP calls and VoIP call drops to calculate a call drop rate. A specific call drop is reflected as follows: An RLF occurs on the UE performing the VoIP service, or an RLC layer is reset.

Figure 4:
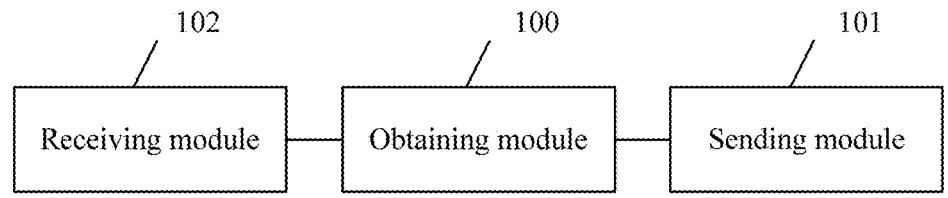
FIG. 4 is a schematic structural diagram of another apparatus for obtaining a quality of service parameter of a VoIP service according to an embodiment of the present disclosure.

Further, on a basis of FIG. 3, FIG. 4 is a schematic structural diagram of another apparatus for obtaining a quality of service parameter of a VoIP service according to an embodiment of the present disclosure. Referring to FIG. 4, the apparatus for obtaining a quality of service parameter of a VoIP service further includes a receiving module 102.

The receiving module 102 is configured to receive, before the obtaining module 100 obtains the quality of service parameter of the VoIP service, an activation command message sent by the measurement trigger device, where the activation command message is used to instruct the obtaining module 100 to obtain the quality of service parameter of the VoIP service.

The activation command message may activate a cell measurement, or activate a UE measurement. Preferably, the activation command message further includes address information of the centralized processing device, so that the wireless access device sends a final measurement result to the centralized processing device according to the address information.

In a case of a UE measurement, the obtaining module 100 is configured to select, according to the activation command message, at least one UE for performing a measurement, and obtain the quality of service parameter of the VoIP service.

Since the activation command message gives an instruction for performing a measurement for only a wireless access device corresponding to a cell, the wireless access device needs to select UEs in the cell for performing a measurement. Therefore, when at least one UE is selected for performing a measurement, the following selection condition needs to be met: whether the at least one UE performs the VoIP service; and/or whether the at least one UE agrees to provide a measurement service for the apparatus.

The apparatus may be a wireless access device. For example, when the UE sets up the service, a core network notifies, using a bearer setup request, a base station to set up a bearer for the UE, where the bearer setup request carries a QCI. The base station may determine, according to the quality of service class, that the bearer is set up for the VoIP service. In addition, when the UE accesses the network, the core network notifies the base station of information about whether the UE agrees to perform an MDT operation. Therefore, the base station may know whether the UE agrees to provide a measurement service for the wireless access device.

When the activation command message gives an instruction for performing a UE measurement, the activation command message includes an identity of the at least one UE, so that the wireless access device measures the at least one corresponding UE according to the identity of the at least one UE, and obtains the quality of service parameter of the VoIP service of the at least one UE.

Optionally, the activation command message further includes quality of service parameter information that needs to be obtained, and the quality of service parameter information that needs to be obtained is used to represent any one or a combination of the following quality of service parameters: the VoIP service delay, the VoIP service jitter, the VoIP service encoding type, the VoIP service packet loss rate, the VoIP service encoding rate, the MOS of the VoIP service, the VoIP signaling delay, the VoIP access failure information, or the VoIP handover failure information.

For example, if the activation command carries an instruction for obtaining VoIP control statistics, it indicates that the VoIP signaling delay, the VoIP access failure information, and the VoIP handover failure information need to be obtained. For another example, if the activation command carries an instruction for obtaining VoIP data statistics, it indicates that the VoIP service delay, the VoIP service jitter, the VoIP service encoding type, the VoIP service packet loss rate, the VoIP service encoding rate, the MOS of the VoIP service, the VoIP signaling delay, the VoIP access failure information, the VoIP handover failure information, the SPS resource utilization efficiency, and the VoIP call drop information need to be obtained.

The obtaining module 100 is configured to measure the at least one corresponding UE according to the identity of the at least one UE, and obtain the quality of service parameter of the VoIP service of the at least one UE.

Preferably, the wireless access device may also not require the activation command message sent by the measurement trigger device, but presets a measurement trigger mechanism, so as to trigger obtaining the quality of service parameter of the VoIP service. Further, the obtaining module 100 is further configured to determine, before obtaining the quality of service parameter of the VoIP service, whether the VoIP service meets a measurement condition; and if the VoIP service meets the measurement condition, the obtaining module 100 is configured to select at least one UE for performing a measurement, and obtain the quality of service parameter of the VoIP service.

The measurement condition may be the wireless access device determines whether a quantity of UEs that perform VoIP services in the cell to which the wireless access device belongs exceeds a certain threshold, and if yes, the measurement condition is met, and a subsequent measurement is triggered. It should be noted that, an implementation form of the measurement condition may be set according to a system requirement and is not limited herein.

The VoIP access failure information includes any one or a combination of the following: the VoIP access failure information count, identity information of a corresponding serving cell during the VoIP access failure, corresponding time information during the VoIP access failure, reference signal quality or strength of a corresponding cell during the VoIP access failure, or transmit power information of the UE during the VoIP access failure.

The VoIP handover failure information includes any one or a combination of the following: the VoIP handover failure count, reference signal quality or strength of a corresponding source cell and/or target cell during the VoIP handover failure, transmit power information of the UE during the VoIP handover failure, identity information of a corresponding source cell during the VoIP handover failure, or identity information of a corresponding target cell during the VoIP handover failure.

The VoIP service delay includes an uplink delay of the VoIP service and/or a downlink delay of the VoIP service; and the VoIP service jitter includes an uplink jitter of the VoIP service and/or a downlink jitter of the VoIP service.

For the quality of service parameters of the VoIP service, the following describes, using a specific embodiment, a method for obtaining some of the quality of service parameters.

A downlink delay of the VoIP service is obtained in the following manner.

The obtaining module 100 is configured to obtain a downlink delay of a data packet of the VoIP service according to a first time and a second time, where the first time is a time at which an acknowledgement message of a last segment of the data packet is received, and the second time is a time of arrival of the data packet at a PDCP layer of the apparatus.

It should be noted that, the first time is the time at which the wireless access device receives the acknowledgement message of the last segment of the data packet, and the second time is the time of arrival of the data packet at the PDCP layer of the wireless access device.

Figure 5:
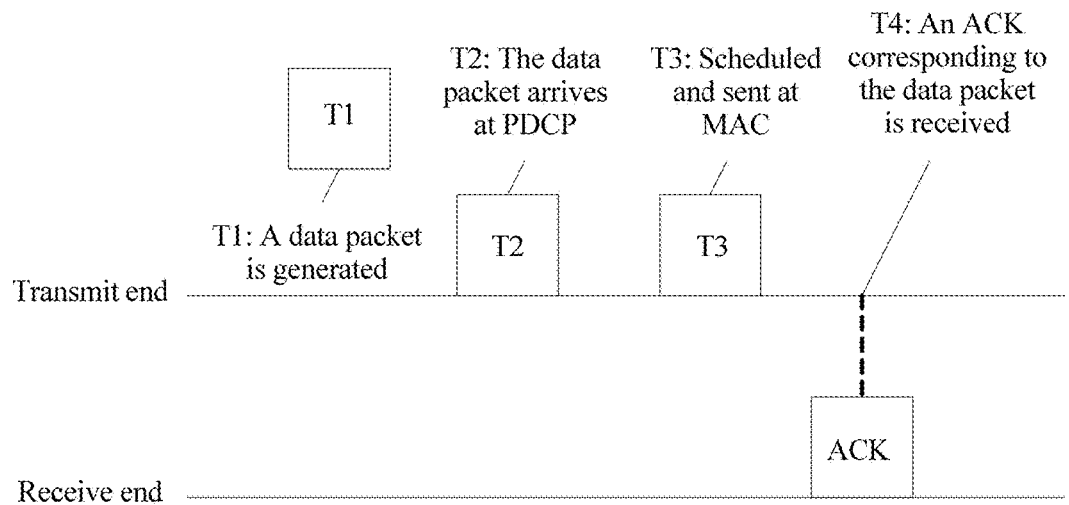
FIG. 5 is a schematic diagram of downlink times of a VoIP service.

FIG. 5 is a schematic diagram of downlink times of a VoIP service. Referring to FIG. 5, FIG. 5 is a process of sending a downlink data packet, T1 represents a time of generating a data packet, T2 is a delay of arrival of the data packet at a PDCP layer of the eNB, T3 is a time of sending the data packet at a media access control (MAC) layer, and T4 is a time at which an acknowledgement message (ACK) of a last segment of the data packet is received. In this case, a downlink delay of the data packet of the VoIP service may be obtained in the following manner:

$$T\text{Delay}_{downlink} = T_4 - T_2 \quad (1)$$

$T_4$ is the time at which the base station receives the acknowledgement message of the last segment of the data packet, and $T_2$ is the time of arrival of the data packet at the PDCP layer of the base station.

Further, because a delay of one data packet cannot reflect accuracy of the downlink delay of the VoIP service in a time period in the system or cell, the downlink delay of the VoIP service in the time period can be obtained only by collecting statistics of downlink delays of data packets in the time period. The following provides two feasible implementation manners to summarize downlink delays of the VoIP service.

Manner 1: The obtaining module 100 is configured to perform averaging on the downlink delays of all the data packets of the VoIP service in the time period, and obtain an average value of the downlink delays of the VoIP service in the time period.

Manner 2: The obtaining module 100 is configured to compare a downlink delay of each data packet of the VoIP service in the time period with a downlink delay threshold, and collect statistics of downlink delays of the data packets of the VoIP service that are greater than or equal to the downlink delay threshold.

The obtaining module 100 is configured to obtain a downlink jitter of the VoIP service according to a difference between downlink delays of any two data packets of the VoIP service in the time period.

Still referring to FIG. 5, the downlink jitter of the VoIP service is obtained using the following formula:

$$T_{downlink\ jitter} = (T_4 - T_2) - (T_4' - T_2').$$

$T_4$ is a time at which the base station receives an acknowledgement message of a last segment of an $i^{th}$ data packet, $T_2$ is a time of arrival of the $i^{th}$ data packet at the PDCP layer of the base station, $T_4'$ is a time at which the base station receives an acknowledgement message of a last segment of a $j^{th}$ data packet, $T_2'$ is a time of arrival of the $j^{th}$ data packet at the PDCP layer of the base station.

Further, because one downlink jitter value of the VoIP service alone cannot reflect accuracy of the downlink jitter of the VoIP service in a time period in the system or cell, statistics of downlink jitters of the VoIP service in the time period need to be collected. The following provides two feasible implementation manners to summarize downlink jitters of the VoIP service.

Manner 1: The obtaining module 100 is configured to perform averaging on all the downlink jitters of the VoIP service in the time period, and obtain an average value of the downlink delays of the VoIP service in the time period.

Manner 2: The obtaining module 100 is configured to compare each downlink jitter of the VoIP service in the time period with a downlink jitter threshold, and collect statistics of downlink jitters of the VoIP service that are greater than or equal to the downlink jitter threshold.

An uplink delay of the VoIP service may be obtained in multiple manners. The following provides several feasible implementation manners.

Manner 1: The uplink delay of the VoIP service is obtained in the following manner.

The obtaining module 100 is configured to obtain an uplink delay of a first data packet of the VoIP service according to a difference between an acknowledgement time and an arrival time, where the acknowledgement time is a time of sending an acknowledgement message of a last segment of the first data packet to the UE, and the arrival time is a time of receiving a scheduling request corresponding to the first data packet; and obtain an uplink delay of any other data packet of the VoIP service according to the uplink delay of the first data packet of the VoIP service and an RTP timestamp of the first data packet.

The uplink delay of the first data packet of the VoIP service is obtained using the following formula:

$$TDelay_{uplink}1 = T_{ACK} - T_{arrive}.$$

The first data packet is a first data packet that the UE is scheduled to transmit, every time the wireless access device receives a scheduling request (SR). $TDelay_{uplink}1$ is the uplink delay of the first data packet, $T_{ACK}$ is the time of sending the acknowledgement message of the last segment of the first data packet to the user equipment UE, and $T_{arrive}$ is the time of receiving the scheduling request corresponding to the first data packet.

According to the uplink delay of the first data packet of the VoIP service, an uplink delay of an $i^{th}$ data packet of the VoIP service is obtained using the following formula:

$$TDelay_{uplink}j = (T_{ACK}j - T_{ACK}) - [Timestamp(j) - Timestamp(1)] \times Tcounter + TDelay_{uplink}1.$$

$TDelay_{uplink}j$ is an uplink delay of a $j^{th}$ data packet, $T_{ACK}j$ is a time at which the base station sends an acknowledgement message of a last segment of the $j^{th}$ data packet, Timestamp(j) is an RTP timestamp of the $j^{th}$ data packet, $T_{ACK}$ is the time at which the base station sends the acknowledgement message of the last segment of the first data packet, Timestamp(1) is the RTP timestamp of the first data packet, Tcounter is a time corresponding to a unit in the timestamp, and $TDelay_{uplink}1$ is the uplink delay of the first data packet.

However, when the manner 1 is used, because a delay generated at a time T1 at which the UE generates the data packet i is ignored, uplink delay processing of the first data packet is simplified. As a result, uplink delay statistics of the first data packet may be inaccurate, and therefore, all packet statistics have a certain offset.

To avoid a possible offset caused by the manner 1, the following provides a manner 2 to correct the foregoing offset. The uplink delay of the VoIP service is obtained in the following manner.

Manner 2: The obtaining module 100 is configured to obtain a first uplink delay of a data packet of the VoIP service according to a difference between a third time and a fourth time, where the third time is a time of receiving the data packet, and the fourth time is a time corresponding to an RTP timestamp of the data packet, where it should be noted that, the third time is a time at which the wireless access device receives the data packet; obtain a delay set including delays of all the data packets in a time period, where the delay set includes first uplink delays of all the data packets of the VoIP service; obtain a first data packet having a shortest first delay in the delay set, as a reference data packet for delay calculation; and obtain an uplink delay of any other data packet of the VoIP service according to the corresponding uplink delay of the first data packet.

For example, the delay set of all the data packets is obtained, and the delay set of all the data packets is:

$$\{T_{sr-arrive}1 \ldots T_{sr-arrive}j \ldots T_{sr-arrive}n\}.$$

Further, $T_{sr-arrive}$ is obtained using the following formula:

$$T_{sr-arrive} = T_{arrive} - Timestamp \times Tcounter.$$

$T_{arrive}$ is a time of receiving a scheduling request corresponding to a data packet, Timestamp is a timestamp value of an RTP packet header in the data packet, and Tcounter is a time corresponding to a unit in the timestamp value.

A data packet q with shortest $T_{sr-arrive}$ in the delay set of all the data packets is obtained, where the delay of the data packet q is obtained using the following formula:

$$TDelay_{uplink}q = T_{ACK}q - T_{arrive}q.$$

$T_{ACK}q$ is a time at which the base station sends an acknowledgement message of a last segment of the data packet q, and $T_{arrive}q$ is a time at which the base station receives the data packet q.

An uplink delay of any other data packet m of the VoIP service is obtained using the following formula:

$$TDelay_{uplink}m = (T_{ACK}m - T_{ACK}q)[Timestamp(m) - Timestamp(q)] \times Tcounter + TDelay_{uplink}q.$$

$TDelay_{uplink}m$ is the uplink delay of the data packet m, $T_{ACK}m$ is a time at which the base station sends an acknowledgement message of a last segment of the data packet m, Timestamp(m) is a timestamp value of an RTP packet header in the data packet m, Timestamp(q) is a timestamp value of an RTP packet header in the data packet q, and Tcounter is a time corresponding to a unit in the timestamp value.

Manner 3: The receiving module 102 is further configured to receive, before the obtaining module 100 obtains the quality of service parameter of the VoIP service, a timestamp value reported by the at least one UE.

An occasion of reporting the timestamp by the UE may be after the UE sets up a VoIP bearer with the wireless access device. Optionally, the sending module 101 of the wireless access device may send an RTP timestamp request to the UE, and the UE reports a timestamp value according to the request. The reported timestamp value represents an internal RTP timestamp value of the UE at a time point when a data packet including the timestamp is sent. Further, the UE may further report a time step value represented by the timestamp.

The obtaining module 100 is further configured to obtain a correspondence between a network time and the UE-side time according to the timestamp value.

For example, if a timestamp reported by the UE is N, and a time at which the network receives a data packet including the timestamp is T1, a correspondence is that T1*Tcounter corresponds to the time N. For a time T2 at which the base station receives another data packet, a formula for calculating a corresponding network time is N+(T2−T1)*Tcounter. Tcounter is a step value of the RTP timestamp.

In this case, the uplink delay of the VoIP service is obtained in the following manner.

The obtaining module 100 is configured to obtain, according to the correspondence between the network time and the UE-side time, a first network time corresponding to a time of sending a first data packet, obtain a second network time corresponding to a time of acknowledging reception of the first data packet, and obtain an uplink delay of the first data packet of the VoIP service according to the first network time and the second network time.

It should be noted that, the second network time is the network time corresponding to the time when the wireless access device acknowledges reception of the first data packet.

For example, when the wireless access device receives a data packet r sent by the at least one UE, a network time T(1) corresponding to a time of sending the data packet r is obtained according to the correspondence. A delay of the data packet r is obtained using the following formula:

$$TDelay_{uplink}r = T_{ACK}r - T(1).$$

TDelay$_{uplink}$r is the delay of the data packet r, and T$_{ACK}$r is a time at which the base station sends an acknowledgement message of a last segment of the data packet r to the UE.

Manner 4: The obtaining module 100 is configured to obtain a data packet sent by the at least one UE, where the data packet carries a sending timestamp, and a correspondence exists between the sending timestamp and a network time of the apparatus.

The apparatus is a wireless access device. The receiving module 102 of the wireless access device, for example, the foregoing first receiving module 102, receives the data packet sent by the UE, and transmits the data packet to the obtaining module 100.

The obtaining module 100 is configured to obtain, according to the correspondence, the network time corresponding to the sending timestamp, and calculate an uplink delay of the data packet of the VoIP service according to the network time corresponding to the sending timestamp.

When the UE initializes the RTP timestamp, the UE performs initialization according to the network time, for example, performs initialization according to a system frame number (SFN) or according to a time indicated in a system information block 16 (SIB16), for example, initial timestamp=network time SFN corresponding to the time+ subframe number. When receiving the data packet, the network-side wireless access device calculates, according to a relationship between the timestamp and the network time, the network time corresponding to the timestamp, and calculates the delay.

Further, because an uplink delay value of one data packet of the VoIP service alone cannot reflect the uplink delay of the VoIP service, statistics of uplink delays of the VoIP service in a time period need to be collected. The following provides two feasible implementation manners to summarize uplink delays of the VoIP service. The obtaining module 100 is configured to perform averaging on uplink delays of all the data packets of the VoIP service in the time period, and obtain an average value of the uplink delays of the VoIP service in the time period; or compare an uplink delay of each data packet of the VoIP service in the time period with an uplink delay threshold, and collect statistics of downlink delays of the VoIP service that are greater than or equal to the uplink delay threshold.

The obtaining module 100 is configured to obtain an uplink jitter of the VoIP service according to a difference between uplink delays of any two data packets of the VoIP service in the time period.

Preferably, the obtaining module 100 is configured to determine the difference between the uplink delays of the any two data packets of the VoIP service according to times of receiving the any two data packets and times corresponding to RTP timestamps of the any two data packets.

Further, because an uplink jitter value of one data packet of the VoIP service alone cannot reflect the uplink jitter of the VoIP service, statistics of uplink jitters of the VoIP service in a time period need to be collected. The following provides two feasible implementation manners to summarize uplink jitters of the VoIP service. The obtaining module 100 is configured to perform averaging on all uplink jitters of the VoIP service in the time period, and obtain an average value of the uplink jitters of the VoIP service in the time period; or compare each uplink jitter of the VoIP service in the time period with an uplink jitter threshold, and collect statistics of uplink jitters of the VoIP service that are greater than or equal to the uplink delay threshold.

Optionally, still referring to FIG. 4, the wireless access device may also instruct the UE to measure the foregoing required quality of service parameter.

The sending module 101 is further configured to send a VoIP service measurement instruction message to at least one UE.

The VoIP service measurement instruction message instructs the UE to measure quality of service parameter information of the VoIP service, and the quality of service parameter information of the VoIP service is used to represent any one or a combination of the following parameters: the VoIP service delay, the VoIP service jitter, the VoIP service encoding type, the VoIP service packet loss rate, the VoIP service encoding rate, the MOS of the VoIP service, the VoIP signaling delay, the VoIP access failure information, the VoIP handover failure information, the SPS resource utilization efficiency, or the VoIP call drop information.

The receiving module 102 is further configured to receive a VoIP service measurement record report message sent by the at least one UE, where the VoIP service measurement record report message includes the quality of service parameter.

Figure 6:
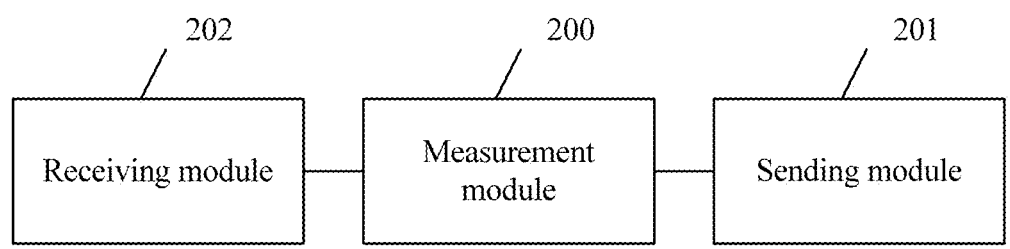
FIG. 6 is a schematic structural diagram of another apparatus for obtaining a quality of service parameter of a VoIP service according to an embodiment of the present disclosure.

FIG. 6 is a schematic structural diagram of another apparatus for obtaining a quality of service parameter of a VoIP service according to an embodiment of the present disclosure. The apparatus for obtaining a quality of service parameter of a VoIP service is user equipment UE having a function of obtaining a quality of service parameter of a VoIP service. Further, the UE may be a smartphone, a tablet, or the like. Referring to FIG. 6, the UE includes a receiving module 202, a measurement module 200, and a sending module 201.

The receiving module 202 is configured to receive a VoIP service measurement instruction message sent by a wireless access device.

The VoIP service measurement instruction message instructs the measurement module to measure quality of service parameter information of a VoIP service, and the quality of service parameter information of the VoIP service is used to represent any one or a combination of the following quality of service parameters: a VoIP service delay, a VoIP service jitter, a VoIP service encoding type, a VoIP service packet size, a VoIP service packet loss rate, a VoIP service encoding rate, a MOS of the VoIP service, a VoIP signaling delay, VoIP access failure information, VoIP handover failure information, SPS resource utilization efficiency, or VoIP call drop information.

The measurement module 200 is configured to perform a measurement to obtain the quality of service parameter.

The sending module 201 is configured to send a VoIP service measurement record report message to the wireless access device, where the VoIP service measurement record report message includes the quality of service parameter. Optionally, after the receiving module 202 receives a VoIP service measurement instruction message sent by a wireless access device 1 and the quality of service parameter is obtained by performing a measurement according to the message, the sending module 201 may also report a VoIP service measurement record to a wireless access device 2. For example, because the UE moves and accesses another wireless access device, the UE may report to the another wireless access device.

In the apparatus for obtaining a quality of service parameter of a VoIP service according to this embodiment, a receiving module receives a VoIP service measurement instruction message sent by a wireless access device, where the VoIP service measurement instruction message instructs the measurement module to measure quality of service parameter information of a VoIP service; the UE performs a measurement to obtain the quality of service parameter; and the sending module sends a VoIP service measurement record report message to the wireless access device, where the VoIP service measurement record report message includes the quality of service parameter, so that a network system obtains quality of service of the VoIP service according to the quality of service parameter of the VoIP service, further helping an operator control and adjust the network system based on the quality of service of the VoIP service.

Further, the foregoing parameter measurement performed by the UE may be implemented in the following manner.

VoIP service packet size: It collects statistics of sizes of voice packets received at a PDCP layer.

VoIP service packet loss rate: It collects statistics of a total quantity of VoIP packets arriving at the PDCP layer of the UE in a time period, and a total quantity of VoIP packets successfully sent by the UE to a base station. A packet loss rate calculated according to the two total quantities is a total quantity of unsuccessfully sent data packets divided by a total quantity of VoIP packets that arrive.

VoIP service encoding rate: It measures an encoding rate corresponding to each VoIP service, and then further measures a total amount of data in packets corresponding to each encoding rate in the time period.

Mean opinion value of the VoIP service: The MOS is an evaluation value of subjective perception of a user on voice quality, and may be obtained according to a delay, a jitter, and a packet loss.

VoIP signaling delay: It includes a call setup delay or a handover delay. For the call setup delay, the UE measures a time from initiating a VoIP service request to acknowledging the VoIP service request, and calculates the call setup delay of the user. A time of initiating the VoIP service request may be a time of generating the VoIP service request in the UE, or a time at which an access layer of the UE triggers the access layer to initiate access for sending the service request. A time of acknowledging the VoIP service request is a time of receiving a VoIP service setup acknowledgement, or a time at which the access layer of the UE receives a bearer setup command for setting up a radio bearer for the VoIP service. For the handover delay, a time from starting a UE handover to completion of the handover is measured, and a user handover delay is calculated. A specific time of starting the handover is a time at which the access layer of the UE receives a radio bearer reconfiguration command including a handover command. A time of completion of the handover is a time at which the UE sends a handover complete command to a target cell, or a time at which the UE sends a first data packet to a target cell.

VoIP access failure information: The UE collects statistics of access attempts in which a VoIP access request is initiated but no VoIP call is set up successfully.

VoIP handover failure information: It records and collects statistics of handover failures when the UE performs the VoIP service.

SPS resource utilization efficiency: The UE may calculate utilization efficiency of an SPS resource according to a quantity of times that the SPS resource is actually used in a time period.

VoIP call drop information: It includes a VoIP call count, a VoIP call drop count, and a VoIP call drop rate, and is used to collect statistics of call drops of the user in the process of performing the VoIP service.

A method for collecting statistics of VoIP call drop information may be implemented in the following manner.

Method for collecting statistics on a UE side: The UE collects statistics of VoIP calls and VoIP call drops to calculate a call drop rate. A specific call drop is reflected as follows: An RLF occurs on the UE performing the VoIP service, or an RLC layer is reset.

Further, the VoIP access failure information includes any one or a combination of the following: the VoIP access failure information count, identity information of a corresponding serving cell during the VoIP access failure, corresponding time information during the VoIP access failure, identity information of a corresponding serving cell during the VoIP access failure, reference signal quality or strength of a corresponding cell during the VoIP access failure, or transmit power information of the UE during the VoIP access failure.

The VoIP handover failure information includes any one or a combination of the following: the VoIP handover failure count, reference signal quality or strength of a corresponding source cell or target cell during the VoIP handover failure, transmit power information of the UE during the VoIP handover failure, identity information of a corresponding source cell during the VoIP handover failure, or identity information of a corresponding target cell during the VoIP handover failure.

The VoIP service delay includes an uplink delay of the VoIP service; and the VoIP service jitter includes an uplink jitter of the VoIP service.

An uplink delay of the VoIP service is obtained in the following manner.

The measurement module 200 is configured to obtain an uplink delay of a data packet of the VoIP service according to a difference between a time of receiving an acknowledgement and a time of generating the data packet, where the time of receiving the acknowledgement is a time at which the receiving module 202 receives an acknowledgement message sent by the wireless access device for a last segment of the data packet, and the time of generating the data packet is a time at which the UE generates the data packet.

Further, uplink delays of the VoIP service are summarized in the following manner.

The measurement module 200 is configured to perform averaging on uplink delays of all the data packets of the VoIP service in a time period, and obtain an average value of the uplink delays of the VoIP service in the time period; or compare an uplink delay of each data packet of the VoIP service in a time period with an uplink delay threshold, and collect statistics of uplink delays of the VoIP service that are greater than or equal to the uplink delay threshold.

The measurement module 200 is configured to obtain an uplink jitter of the VoIP service according to a difference between uplink delays of any two data packets of the VoIP service in the time period.

The measurement module 200 is configured to determine the difference between the uplink delays of the any two data packets of the VoIP service according to times of receiving the any two data packets and times corresponding to RTP timestamps of the any two data packets.

The measurement module 200 obtains the uplink jitter of the VoIP service according to the difference between the uplink delays of the any two data packets of the VoIP service in the time period. The uplink delay of the data may be calculated according to the foregoing delay calculation method, or may be calculated in a relative manner.

For example, an uplink delay of a $J^{th}$ packet is:

$$T\text{Delay}_{uplink}j = T_{ACK}j - [\text{Timestamp}(j)] \times T\text{counter}.$$

For example, an uplink delay of a $(J+1)^{th}$ packet is:

$T\text{Delay}_{uplink}j+1-[\text{Timestamp}(j+1)] \times T\text{counter.}$

In this case, a jitter calculation formula is:

$T\text{Delay}_{uplink}(j+1)-T\text{Delay}_{uplink}j=T_{ACK}(j+1)-T_{ACK}(j)-[\text{Timestamp}(j+1)-\text{Timestamp}(j)] \times T\text{counter.}$ Although a clock used for recording a Timestamp in an RTP packet in the two calculation steps may be different from a network clock for calculating $T_{ACK}$, because two times actually used in jitter calculation are two relative acknowledgement times (times corresponding to $T_{ACK}$) and two relative packet generation times (times corresponding to the Timestamp), the jitter is not affected by asynchronization of the clocks, and the jitter may be calculated according to network acknowledgement times of the two data packets and the time indicated by the Timestamp in the RTP packet.

Further, uplink jitters of the VoIP service are summarized in the following manner.

The measurement module 200 is configured to perform averaging on all uplink jitters of the VoIP service in the time period, and obtain an average value of the uplink jitters of the VoIP service in the time period; or compare each uplink jitter of the VoIP service in the time period with an uplink jitter threshold, and collect statistics of uplink jitters of the VoIP service that are greater than or equal to the uplink delay threshold.

In the foregoing embodiment, regardless of whether the wireless access device or the UE obtains a measurement report, the obtaining may be implemented periodically. For example, according to a fixed period, the wireless access device or the UE collects statistics of service features of VoIP data in the period and performs averaging to obtain a measurement result. Alternatively, only measurement results that exceed a particular threshold, for example, a quantity of data packets whose delays exceed a particular time and delay values corresponding to the data packets, are collected.

It should be noted that, for a formula for obtaining the foregoing parameter by the UE, reference may be made to the embodiment of the base station side, and details are not described again in the embodiment of the UE side. After quality of service parameters in a time period are obtained, summarization may not be performed. Instead, the quality of service parameters are reported to the wireless access device, and the wireless access device performs summarization and statistical processing. For the manner of summarizing the quality of service parameters provided in the foregoing embodiment, only summarization processing is described. A person skilled in the art may develop other summarization manners based on the foregoing manner without creative efforts. Therefore, other summarization manners may also fall within the scope of this embodiment of the present disclosure.

Figure 7:
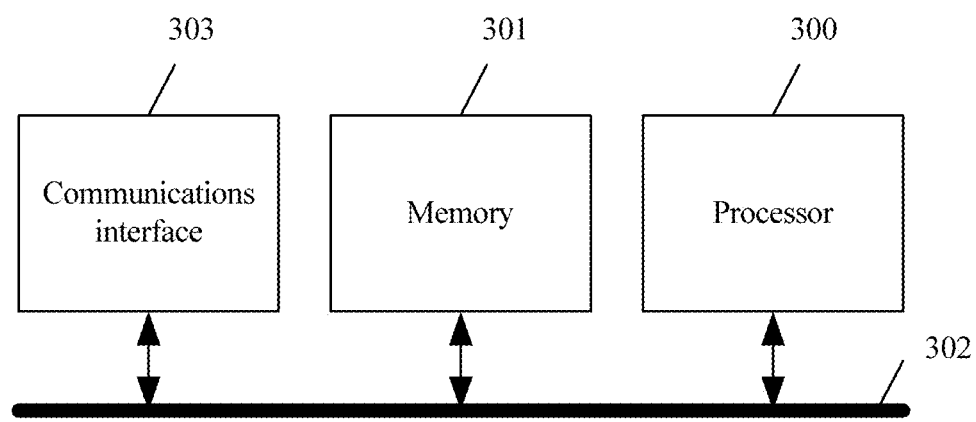
FIG. 7 is a schematic structural diagram of another apparatus for obtaining a quality of service parameter of a VoIP service according to an embodiment of the present disclosure.

FIG. 7 is a schematic structural diagram of another apparatus for obtaining a quality of service parameter of a VoIP service according to an embodiment of the present disclosure. The apparatus is a wireless access device. Referring to FIG. 7, the apparatus includes a processor 300, a memory 301, a bus 302, and a communications interface 303.

The memory 301 is configured to store a computer-executable instruction, the processor 300 is connected to the memory 301 by the bus 302, and when the apparatus runs, the processor 300 executes the computer-executable instruction stored in the memory 301.

The processor 300 is configured to obtain a quality of service parameter of a VoIP service. The quality of service parameter of the VoIP service includes at least one of the following: a VoIP service delay, a VoIP service jitter, a VoIP service encoding type, a VoIP service packet size, a VoIP service packet loss rate, a VoIP service encoding rate, a MOS of the VoIP service, a VoIP signaling delay, VoIP access failure information, VoIP handover failure information, semi-persistent scheduling SPS resource utilization efficiency, or VoIP call drop information.

The communications interface 303 is configured to send a quality parameter report of the VoIP service to a centralized processing device. The quality parameter report of the VoIP service includes the quality of service parameter of the VoIP service.

In the apparatus for obtaining a quality of service parameter of a VoIP service according to this embodiment, a processor obtains a quality of service parameter of a VoIP service, and a communications interface sends a quality parameter report of the VoIP service to a centralized processing device. The quality parameter report of the VoIP service includes the quality of service parameter of the VoIP service, so that a network system obtains quality of service of the VoIP service according to the quality of service parameter of the VoIP service, further helping an operator control and adjust the network system based on the quality of service of the VoIP service.

Optionally, the communications interface 303 is further configured to receive, before the processor 300 obtains the quality of service parameter of the VoIP service, an activation command message sent by the measurement trigger device, where the activation command message is used to instruct the processor 300 to obtain the quality of service parameter of the VoIP service.

Further, the processor 300 is configured to select, according to the activation command message, at least one UE for performing a measurement, and obtain the quality of service parameter of the VoIP service.

Optionally, the selecting at least one UE for performing a measurement needs to meet the following selection condition: whether the at least one UE performs the VoIP service; and/or whether the at least one UE agrees to provide a measurement service for the apparatus.

The activation command message includes an identity of the at least one UE; and the processor 300 is configured to measure the at least one corresponding UE according to the identity of the at least one UE, and obtain the quality of service parameter of the VoIP service of the at least one UE.

Optionally, the activation command message further includes quality of service parameter information that needs to be obtained, and the quality of service parameter information that needs to be obtained is used to represent any one or a combination of the following quality of service parameters: the VoIP service delay, the VoIP service jitter, the VoIP service encoding type, the VoIP service packet size, the VoIP service packet loss rate, the VoIP service encoding rate, the MOS of the VoIP service, the VoIP signaling delay, the VoIP access failure information, the VoIP handover failure information, the SPS resource utilization efficiency, or the VoIP call drop information.

Optionally, the processor 300 is further configured to determine, before obtaining the quality of service parameter of the VoIP service, whether the VoIP service meets a measurement condition; and if the VoIP service meets the measurement condition, the processor 300 is configured to select at least one UE for performing a measurement, and obtain the quality of service parameter of the VoIP service.

Optionally, the VoIP access failure information includes any one or a combination of the following: the VoIP access failure information count, identity information of a corresponding serving cell during the VoIP access failure, corresponding time information during the VoIP access failure, reference signal quality or strength of a corresponding cell during the VoIP access failure, or transmit power information of the UE during the VoIP access failure.

Optionally, the VoIP handover failure information includes any one or a combination of the following: the VoIP handover failure count, reference signal quality or strength of a corresponding source cell and/or target cell during the VoIP handover failure, transmit power information of the UE during the VoIP handover failure, identity information of a corresponding source cell during the VoIP handover failure, or identity information of a corresponding target cell during the VoIP handover failure.

Optionally, the VoIP service delay includes an uplink delay of the VoIP service and/or a downlink delay of the VoIP service; and the VoIP service jitter includes an uplink jitter of the VoIP service and/or a downlink jitter of the VoIP service.

The processor 300 is configured to obtain a downlink delay of a data packet of the VoIP service according to a first time and a second time, where the first time is a time of receiving an acknowledgement message of a last segment of the data packet, and the second time is a time of arrival of the data packet at a PDCP layer of the apparatus.

Further, the processor 300 is configured to perform averaging on downlink delays of all the data packets of the VoIP service in a time period, and obtain an average value of the downlink delays of the VoIP service in the time period; or compare a downlink delay of each data packet of the VoIP service in a time period with a downlink delay threshold, and collect statistics of downlink delays of the data packets of the VoIP service that are greater than or equal to the downlink delay threshold.

Further, the processor 300 is configured to obtain a downlink jitter of the VoIP service according to a difference between downlink delays of any two data packets of the VoIP service in the time period.

Further, the processor 300 is configured to perform averaging on all downlink jitters of the VoIP service in the time period, and obtain an average value of the downlink delays of the VoIP service in the time period; or compare each downlink jitter of the VoIP service in the time period with a downlink jitter threshold, and collect statistics of downlink jitters of the VoIP service that are greater than or equal to the downlink jitter threshold.

Further, the processor 300 is configured to obtain an uplink delay of a first data packet of the VoIP service according to a difference between an acknowledgement time and an arrival time, where the acknowledgement time is a time of sending an acknowledgement message of a last segment of the first data packet to the UE, and the arrival time is a time of receiving a scheduling request corresponding to the first data packet; and obtain an uplink delay of any other data packet of the VoIP service according to the uplink delay of the first data packet of the VoIP service and an RTP timestamp of the first data packet.

Further, the processor 300 is configured to obtain a first uplink delay of a data packet of the VoIP service according to a difference between a third time and a fourth time, where the third time is a time of receiving the data packet, and the fourth time is a time corresponding to an RTP timestamp of the data packet; obtain a delay set including delays of all the data packets in a time period, where the delay set includes first uplink delays of all the data packets of the VoIP service; obtain a first data packet having a shortest first delay in the delay set, as a reference data packet for delay calculation; and obtain an uplink delay of any other data packet of the VoIP service according to the corresponding uplink delay of the first data packet.

Further, the communications interface 303 is further configured to receive, before the processor 300 obtains the quality of service parameter of the VoIP service, a timestamp value reported by the at least one UE; the processor 300 is further configured to obtain a correspondence between a network time and the UE-side time according to the timestamp value; and the processor 300 is configured to obtain, according to the correspondence between the network time and the UE-side time, a first network time corresponding to a time of sending a first data packet, obtain a second network time corresponding to a time of acknowledging reception of the first data packet, and obtain an uplink delay of the first data packet of the VoIP service according to the first network time and the second network time.

Further, the processor 300 is configured to obtain a data packet sent by the at least one UE, where the data packet carries a sending timestamp, and a correspondence exists between the sending timestamp and a network time of the apparatus; and obtain, according to the correspondence, the network time corresponding to the sending timestamp, and calculate an uplink delay of the data packet of the VoIP service according to the network time corresponding to the sending timestamp.

The processor 300 is configured to perform averaging on uplink delays of all the data packets of the VoIP service in the time period, and obtain an average value of the uplink delays of the VoIP service in the time period; or compare an uplink delay of each data packet of the VoIP service in the time period with an uplink delay threshold, and collect statistics of downlink delays of the VoIP service that are greater than or equal to the uplink delay threshold.

Optionally, the processor 300 is configured to obtain an uplink jitter of the VoIP service according to a difference between uplink delays of any two data packets of the VoIP service in the time period.

The processor 300 is configured to determine the difference between the uplink delays of the any two data packets of the VoIP service according to times of receiving the any two data packets and times corresponding to RTP timestamps of the any two data packets.

Further, the processor 300 is configured to perform averaging on all uplink jitters of the VoIP service in the time period, and obtain an average value of the uplink jitters of the VoIP service in the time period; or compare each uplink jitter of the VoIP service in the time period with an uplink jitter threshold, and collect statistics of uplink jitters of the VoIP service that are greater than or equal to the uplink delay threshold.

Optionally, the communications interface 303 is further configured to send a VoIP service measurement instruction message to at least one UE, where the VoIP service measurement instruction message instructs the UE to measure quality of service parameter information of the VoIP service, and the quality of service parameter information of the VoIP service is used to represent any one or a combination of the following parameters: the VoIP service delay, the VoIP service jitter, the VoIP service encoding type, the VoIP service packet loss rate, the VoIP service encoding rate, the MOS of the VoIP service, the VoIP signaling delay, the VoIP access failure information, the VoIP handover failure information, or the SPS resource utilization efficiency; and the communications interface 303 is further configured to receive a VoIP service measurement record report message sent by the at least one UE, where the VoIP service measurement record report message includes the quality of service parameter.

Figure 8:
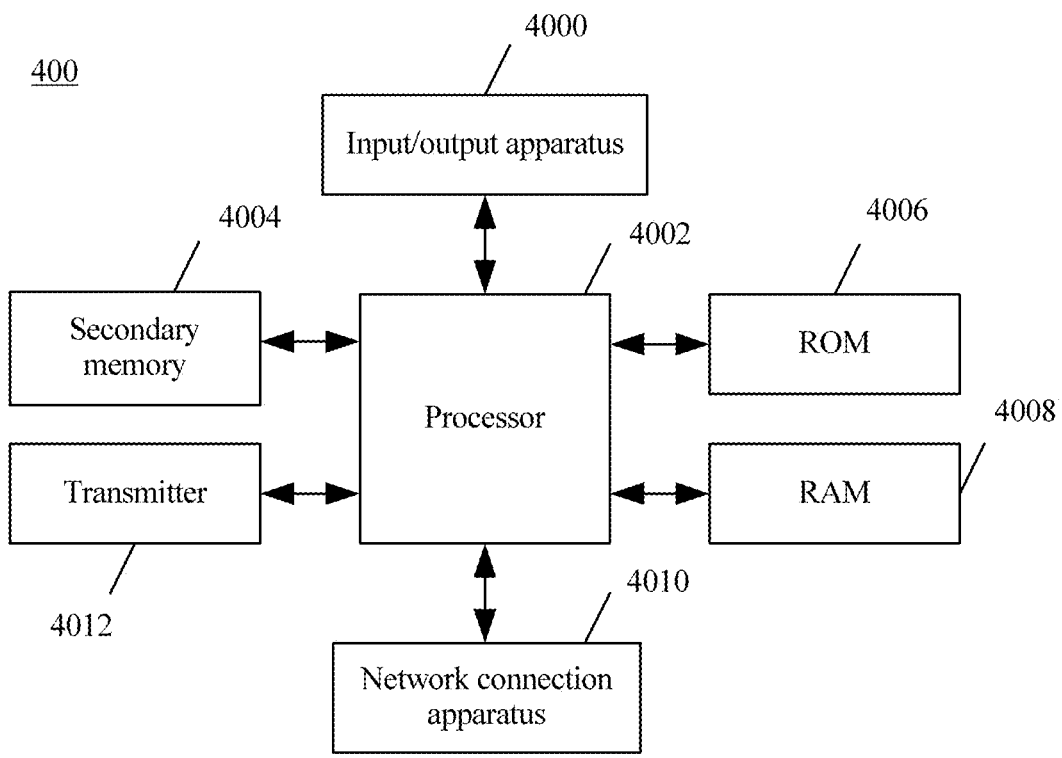
FIG. 8 is a schematic structural diagram of a general-purpose network component according to an embodiment of the present disclosure.

FIG. 8 is a schematic structural diagram of a general-purpose network component according to an embodiment of the present disclosure. FIG. 8 shows a typical general-purpose network component 400, which is applicable to implementation of one or more embodiments of the component and method disclosed in the text. The network component 400 may include a processor 4002 (which may be referred to as a central processing unit or a CPU). The network component communicates with a storage apparatus including the following items: a secondary memory 4004, a read-only memory (ROM) 4006, a random access memory (RAM) 4008, an input/output (I/O) apparatus 4000, and a network connection apparatus 4010. The processor 4002 may be implemented as one or more CPU chips, or may be a part of one or more application-specific integrated circuits (ASIC).

The network component 400 may be applied to devices such as a base station, a relay node, a repeater, or a D2D device.

The secondary memory 4004 generally includes one or more disk drives or tape drives, and is used for non-volatile storage of data. In addition, if a capacity of the RAM 4008 is insufficient for storing all operational data, the secondary memory is used as a storage apparatus for overflowed data. The secondary memory 4004 may be configured to store a program. When selected for execution, the program is loaded to the RAM 4008. The ROM 4006 is configured to store an instruction and data that may be read when the program is executed. The ROM 4006 is a non-volatile storage apparatus, and its storage capacity is generally small, in comparison with a large storage capacity of the secondary memory 4004. The RAM 4008 is configured to store volatile data, and may be further configured to store an instruction. Access to the ROM 4006 and the RAM 4008 is generally faster than access to the secondary memory 4004. The processor 4002 may implement all functions of the processor 300 in the foregoing wireless access device. The I/O apparatus 4000, a transmitter 4012, and the network connection apparatus 4010 can implement all functions of the communications interface 303 in the foregoing wireless access device.

Figure 9:
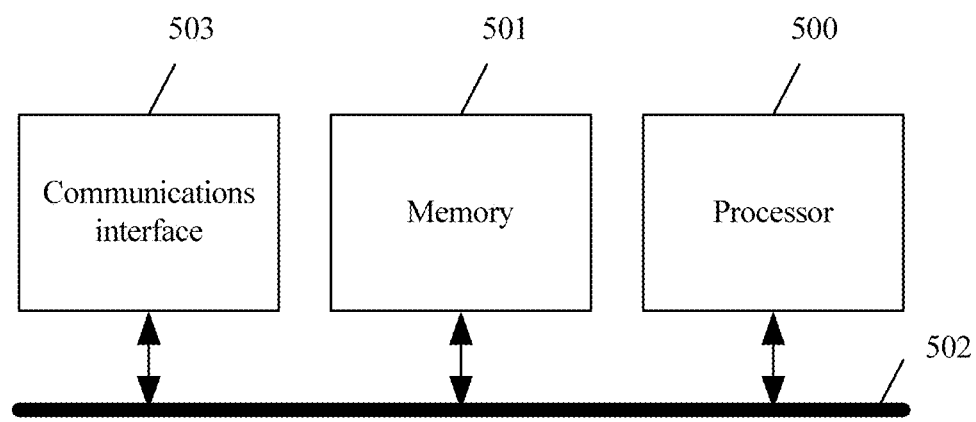
FIG. 9 is a schematic structural diagram of another apparatus for obtaining a quality of service parameter of a VoIP service according to an embodiment of the present disclosure.

FIG. 9 is a schematic structural diagram of another apparatus for obtaining a quality of service parameter of a VoIP service according to an embodiment of the present disclosure. The apparatus is UE. Referring to FIG. 9, the apparatus includes a processor 500, a memory 501, a bus 502, and a communications interface 503.

The memory 501 is configured to store a computer-executable instruction, the processor 500 is connected to the memory 501 by the bus 502, and when the apparatus runs, the processor 500 executes the computer-executable instruction stored in the memory 501.

The communications interface 503 is configured to receive a VoIP service measurement instruction message sent by a wireless access device, where the VoIP service measurement instruction message instructs the processor to measure quality of service parameter information of a VoIP service, and the quality of service parameter information of the VoIP service is used to represent any one or a combination of the following quality of service parameters: a VoIP service delay, a VoIP service jitter, a VoIP service encoding type, a VoIP service packet size, a VoIP service packet loss rate, a VoIP service encoding rate, a MOS of the VoIP service, a VoIP signaling delay, VoIP access failure information, VoIP handover failure information, SPS resource utilization efficiency, or VoIP call drop information; and further configured to send a VoIP service measurement record report message to the wireless access device, where the VoIP service measurement record report message includes the quality of service parameter.

The processor 500 is configured to perform a measurement to obtain the quality of service parameter.

In the apparatus for obtaining a quality of service parameter of a VoIP service according to this embodiment, a communications interface receives a VoIP service measurement instruction message sent by a wireless access device, where the VoIP service measurement instruction message instructs the processor to measure quality of service parameter information of a VoIP service; the processor performs a measurement to obtain the quality of service parameter; and the UE sends a VoIP service measurement record report message to the wireless access device, where the VoIP service measurement record report message includes the quality of service parameter, so that a network system obtains quality of service of the VoIP service according to the quality of service parameter of the VoIP service, further helping an operator control and adjust the network system based on the quality of service of the VoIP service.

Optionally, the VoIP access failure information includes any one or a combination of the following: the VoIP access failure information count, identity information of a corresponding serving cell during the VoIP access failure, corresponding time information during the VoIP access failure, identity information of a corresponding serving cell during the VoIP access failure, reference signal quality or strength of a corresponding cell during the VoIP access failure, or transmit power information of the UE during the VoIP access failure.

Optionally, the VoIP handover failure information includes any one or a combination of the following: the VoIP handover failure count, reference signal quality or strength of a corresponding source cell or target cell during the VoIP handover failure, transmit power information of the UE during the VoIP handover failure, identity information of a corresponding source cell during the VoIP handover failure, or identity information of a corresponding target cell during the VoIP handover failure.

Optionally, the VoIP service delay includes an uplink delay of the VoIP service; and the VoIP service jitter includes an uplink jitter of the VoIP service.

Further, an uplink delay of the VoIP service is obtained in the following manner.

The processor 500 obtains an uplink delay of a data packet of the VoIP service according to a difference between a time of receiving an acknowledgement and a time of generating the data packet, where the time of receiving the acknowledgement is a time at which the communications interface receives an acknowledgement message sent by the wireless access device for a last segment of the data packet, and the time of generating the data packet is a time at which the UE generates the data packet.

Further, uplink delays of the VoIP service are summarized in the following manner.

The processor 500 performs averaging on uplink delays of all the data packets of the VoIP service in a time period, and obtains an average value of the uplink delays of the VoIP service in the time period; or the processor 500 compares an uplink delay of each data packet of the VoIP service in a time period with an uplink delay threshold, and collects statistics of uplink delays of the VoIP service that are greater than or equal to the uplink delay threshold.

Optionally, the processor 500 obtains an uplink jitter of the VoIP service according to a difference between uplink delays of any two data packets of the VoIP service in the time period.

The processor 500 is configured to determine the difference between the uplink delays of the any two data packets of the VoIP service according to times of receiving the any two data packets and times corresponding to RTP timestamps of the any two data packets.

Further, uplink jitters of the VoIP service are summarized in the following manner.

The processor 500 performs averaging on all uplink jitters of the VoIP service in the time period, and obtains an average value of the uplink jitters of the VoIP service in the time period; or the processor 500 compares each uplink jitter of the VoIP service in the time period with an uplink jitter threshold, and collects statistics of uplink jitters of the VoIP service that are greater than or equal to the uplink delay threshold.

Figure 10:
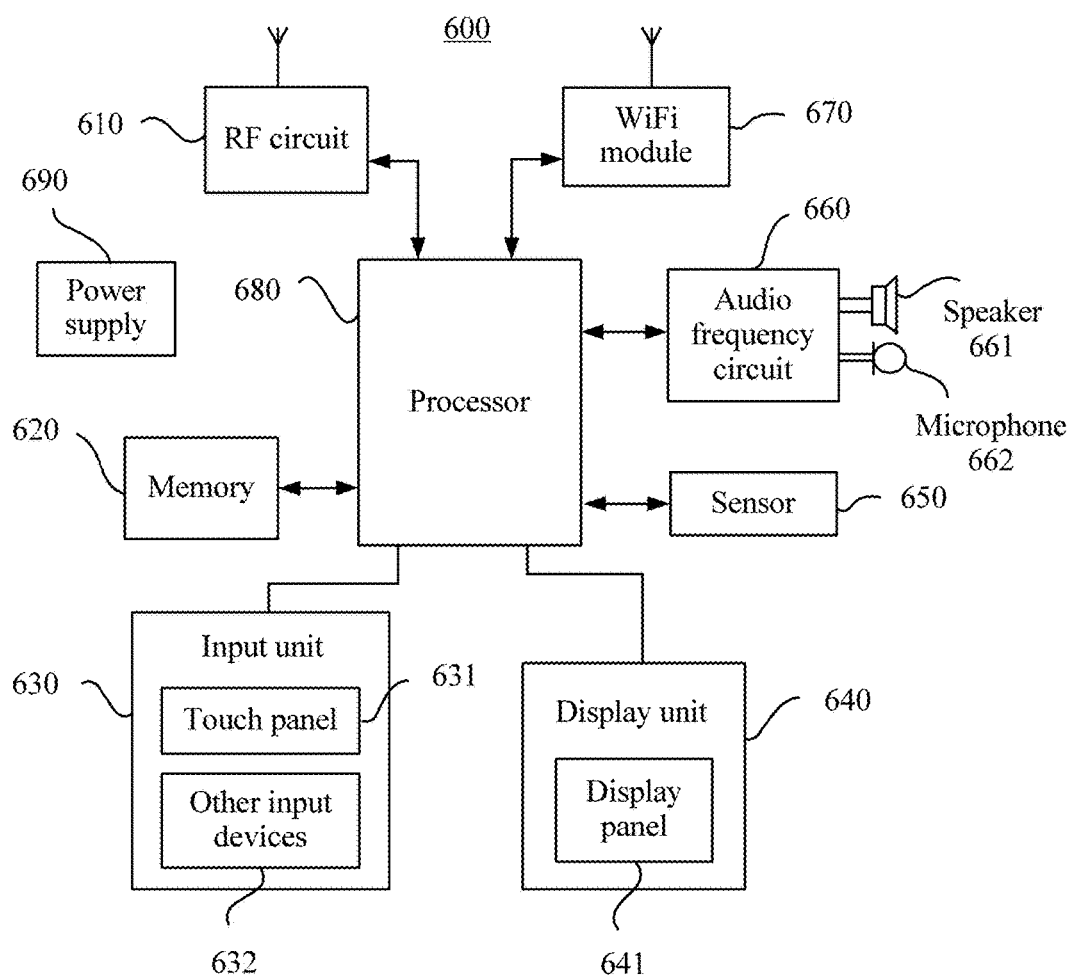
FIG. 10 shows a schematic structural diagram of another user equipment according to Embodiment of the present disclosure.

Further, FIG. 10 shows a schematic structural diagram of another user equipment according to Embodiment 5 of the present disclosure. The user equipment may be a terminal device including a smartphone, a tablet, a personal digital assistant (PDA), a point of sale (POS), a vehicle-mounted computer, or the like. FIG. 10 is a block diagram of a partial structure of a mobile phone 600 related to the user equipment provided by this embodiment of the present disclosure. Referring to FIG. 10, the mobile phone 600 includes components such as a radio frequency (RF) circuit 610, a memory 620, an input unit 630, a display unit 640, a sensor 650, an audio frequency circuit 660, a WiFi module 670, a processor 680, and a power supply 690. A person skilled in the art may understand that, a mobile phone structure shown in FIG. 10 is only an example of an implementation manner and does not constitute a limitation on the mobile phone. The mobile phone may include more or less components than those shown in the figure, or combine some components, or have different component arrangements.

The following describes each component of the mobile phone 600 in detail with reference to FIG. 10.

The RF circuit 610 may be configured to receive or transmit signals in an information reception or transmission or call process, and in particular, after receiving downlink information from a base station, transmit the information to the processor 680 for processing, and in addition, transmit designed uplink data to the base station. Generally, the RF circuit includes but is not limited to an antenna, at least one amplifier, a transceiver, a coupler, a low noise amplifier (LNA), a duplexer, and the like. In addition, the RF circuit 610 may further communicate with a network and other devices through wireless communication. The wireless communication may use any communications standard or protocol, including but not limited to the Global System for Mobile communication (GSM), General Packet Radio Service (GPRS), Code Division Multiple Access (CDMA), Wideband Code Division Multiple Access (WCDMA), LTE, electronic-mail (e-mail), short message service (SMS), and the like.

The memory 620 may be configured to store a software program and module. The processor 680 executes various function applications and data processing of the mobile phone 600 by running the software program and module stored in the memory 620. The memory 620 may mainly include a program storage area and a data storage area. The program storage area may store an operating system, an application program required by at least one function (such as an audio playing function and an image playing function), and the like. The data storage area may store data (such as audio data and a phone book) that is created according to use of the mobile phone 600, and the like. In addition, the memory 620 may include a high-speed random access memory, and may further include a non-volatile memory, for example, at least one magnetic disk storage, a flash memory, or other volatile solid state memories.

The input unit 630 may be configured to receive input digit or character information, and generate a key signal input related to a user setting and function control of the mobile phone 600. The input unit 630 may include a touch panel 631 and other input devices 632. The touch panel 631, also referred to as a touchscreen, may capture a touch operation of a user on or near the touch panel (for example, an operation performed by the user using any appropriate object or accessory such as a finger or a stylus on the touch panel 631 or near the touch panel 631), and drive a corresponding connection apparatus according to a preset program. Optionally, the touch panel 631 may include two parts: a touch detection apparatus and a touch controller. The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 680, and can receive a command transmitted by the processor 680 and execute the command. In addition, the touch panel 631 may be implemented using multiple types such as resistive, capacitive, infrared, and surface acoustic wave. In addition to the touch panel 631, the input unit 630 may further include the other input devices 632. The other input devices 632 may include but are not limited to one or more of a physical keyboard, a function key (such as a volume control button and a power on/off button), a trackball, a mouse, a joystick, and the like.

The display unit 640 may be configured to display information input by the user or information provided for the user and various menus of the mobile phone 600. The display unit 640 may include a display panel 641. Optionally, the display panel 641 may be configured in a form of a liquid crystal display (LCD), an organic light-emitting diode (OLED), or the like. Further, the touch panel 631 may cover the display panel 641. When the touch panel 631 detects a touch operation on or near the touch panel, the touch panel 631 transmits the touch operation to the processor 680 to determine a type of a touch event. Afterward, the processor 680 provides a corresponding visual output on the display panel 641 according to the type of the touch event. Although the touch panel 631 and the display panel 641 are used as two independent components to implement input and output functions of the mobile phone 600 in FIG. 10, the touch panel 631 and the display panel 641 may be integrated to implement input and output functions of the mobile phone 600 in some embodiments.

The mobile phone 600 may further include at least one sensor 650, for example, a light sensor, a motion sensor, and other sensors. The light sensor may include an ambient light sensor and a proximity sensor. The ambient light sensor may adjust luminance of the display panel 641 according to brightness of ambient light. The proximity sensor may turn off and/or backlight the display panel 641 when the mobile phone 600 moves to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture application of the mobile phone (such as switching between landscape and portrait, related games, and magnetometer posture calibration), vibration recognition related functions (such as a pedometer and stroke), and the like. As regards other sensors that can be configured for the mobile phone 600, such as a gyroscope, a barometer, a hygrometer, a thermometer, and an infrared sensor, details are not described herein.

The audio frequency circuit 660, a speaker 661, and a microphone 662 may provide an audio interface between the user and the mobile phone 600. The audio frequency circuit 660 may transmit an electrical signal converted from received audio data to the speaker 661, and the speaker 661 converts the electrical signal into an audio signal for outputting. On the other hand, the microphone 662 converts a captured audio signal into an electrical signal, and the audio frequency circuit 660 converts the received electrical signal into audio data, and then outputs the audio data to the processor 680 for processing; then the audio data is transmitted to another mobile phone through the RF circuit 610, or the audio data is output to the memory 620 for further processing.

WiFi is a short-distance wireless transmission technology. The mobile phone 600 may help, using the WiFi module 670, the user to send and receive e-mails, browse web pages, access streaming media, and so on. It provides wireless broadband Internet access for the user. Although FIG. 10 shows the WiFi module 670, it is understandable that, the WiFi module 670 is not a necessary component of the mobile phone 600, and may be completely omitted according to a requirement without changing the essence of the present disclosure.

The processor 680 is a control center of the mobile phone 600. The processor 680 uses various interfaces and lines to connect all parts of the entire mobile phone, and executes various functions and data processing of the mobile phone 600 by running or executing the software program and/or module stored in the memory 620 and invoking data stored in the memory 620, thereby performing overall monitoring on the mobile phone. Optionally, the processor 680 may include one or more processing units. Preferably, the processor 680 may integrate an application processor and a modem processor, where the application processor mainly processes the operating system, a user interface, an application program, and the like, and the modem processor mainly processes wireless communication. It is understandable that the modem processor may also not be integrated in the processor 680.

The mobile phone 600 further includes the power supply 690 (such as a battery) supplying power to each component. Preferably, the power supply may be logically connected to the processor 680 using a power management system, so as to implement functions such as charge and discharge management and power consumption management using the power management system.

Although not shown, the mobile phone 600 may further include a camera, a Bluetooth module, and the like, which are not described herein.

In this embodiment of the present disclosure, the processor has all functions of the processor of the user equipment in the foregoing description. The RF circuit 610 and the WiFi module 670 have all functions of the communications interface of the UE in the foregoing description.

Referring to FIG. 1, an embodiment of the present disclosure provides a system for obtaining a quality of service parameter of a VoIP service. The system includes at least one apparatus for obtaining a quality of service parameter of a VoIP service as shown in FIG. 3 or FIG. 4. The apparatus is an eNB in FIG. 1. The apparatus may execute all functions in the embodiment corresponding to FIG. 3 or FIG. 4, and achieve a corresponding technical effect. The system further includes at least one apparatus for obtaining a quality of service parameter of a VoIP service as shown in FIG. 6. The apparatus is UE in FIG. 1. The apparatus may execute all functions in the embodiment corresponding to FIG. 6, and achieve a corresponding technical effect.

Alternatively, the system includes at least one apparatus for obtaining a quality of service parameter of a VoIP service as shown in FIG. 7 or FIG. 8. The apparatus is an eNB in FIG. 1. The apparatus may execute all functions in the embodiment corresponding to FIG. 7 or FIG. 8, and achieve a corresponding technical effect. The system further includes at least one apparatus for obtaining a quality of service parameter of a VoIP service as shown in FIG. 9 or FIG. 10. The apparatus is UE in FIG. 1. The apparatus may execute all functions in the embodiment corresponding to FIG. 9 or FIG. 10, and achieve a corresponding technical effect.

Further, the system further includes the centralized processing device TCE configured to receive a quality parameter report of a VoIP service sent by an eNB. The TCE may collect quality parameter reports of the VoIP service that are sent by all connected eNBs, and summarize and provide the quality parameter reports to operation and maintenance personnel, so that the operation and maintenance personnel analyze the quality parameter reports of the VoIP service.

Optionally, the system may further include an MDT trigger device, and the device is configured to trigger a solution to measuring a quality of service parameter of a VoIP service.

Figure 11:
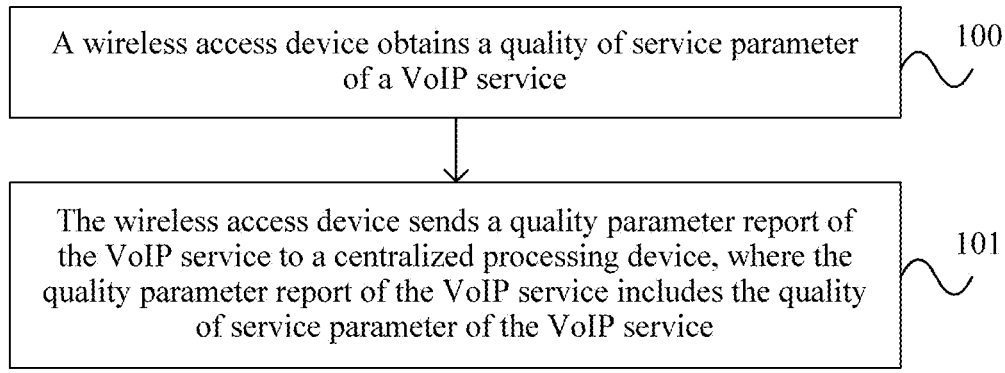
FIG. 11 is a schematic flowchart of a method for obtaining a quality of service parameter of a VoIP service according to an embodiment of the present disclosure.

FIG. 11 is a schematic flowchart of a method for obtaining a quality of service parameter of a VoIP service according to an embodiment of the present disclosure. The method is performed by a wireless access device. The wireless access device may be a base station, a relay node, a repeater, a D2D device, or the like. Unless otherwise specified in the following description, a base station is used as an example. Referring to FIG. 11, the method includes the following steps.

Step 100: A wireless access device obtains a quality of service parameter of a VoIP service.

The quality of service parameter of the VoIP service includes at least one of the following: a VoIP service delay, a VoIP service jitter, a VoIP service encoding type, a VoIP service packet size, a VoIP service packet loss rate, a VoIP service encoding rate, a MOS of the VoIP service, a VoIP signaling delay, VoIP access failure information, VoIP handover failure information, SPS resource utilization efficiency, or VoIP call drop information.

VoIP service delay: An end-to-end delay is one of the most important factors that affect quality of interactive voice communication. The end-to-end delay must be controlled within an appropriate value. Otherwise, a listening party misunderstands that a speaking party does not start to speak, and therefore speaks. However, if a conversation of the other party arrives due to the VoIP service delay at this time, a voice collision occurs between the two parties in the call (For example, during a QQ video, sometimes a long delay and an echo occur; one party already starts to speak, but an echo is received after a time interval; the other party also hears the voice at a corresponding time. Therefore, the delay affects voice perception greatly).

VoIP service packet loss rate: In a network, there are mainly two packet loss cases. One is that packets are lost randomly, and when a collision occurs in the network, one or two data packets are lost occasionally. The other is a burst packet loss, which means that at least one data packet is lost continuously, and voice quality of the VoIP service is obviously affected.

VoIP service jitter: It is a time difference of arrival of all sent data packets in an IP call process. When a data packet is sent, a transmit end adds a timestamp to an RTP packet header. When the data packet is received at the other end, a receive end also adds another timestamp. A channel transmission time of the data packet may be obtained by calculating the two timestamps. If a call includes different channel transmission times, a jitter exists. In the call, an effect presented by the VoIP jitter is similar to an effect generated by a packet loss, and some letters or words are incorrect or are heard unclearly. A value of the jitter depends on a difference between channel transmission times of data packets. If the difference is greater, the jitter is also greater.

It should be noted that, a second 32 Bit of a RTP packet header is a timestamp of an RTP packet, and occupies 32 bits. The timestamp reflects a sampling time of a first byte of data in the RTP packet. An initial value of a timestamp at the beginning of a session is also selected randomly. Even if no signal is sent, a numeric value of the timestamp increases continuously as the time elapses. By using the timestamp, the receive end may accurately know when to restore which data block, and therefore eliminate a jitter in transmission. The timestamp may be further used to synchronize voices and images in a video application.

VoIP signaling delay: It is mainly used to collect statistics of transmission delays of VoIP signaling, and used to diagnose problems of too long call delays, including a VoIP call setup delay and a VoIP handover delay. VoIP access failure: It is mainly used to collect statistics of failures when a user initiates VoIP access, and used to diagnose problems of call failures. VoIP handover failure: It is mainly used to collect statistics of problems of handover failures when the user performing the VoIP service is handed over.

VoIP service encoding type: Currently, the 3GPP specifies that voice encoding formats are AMR and AMR-WB. AMR-WB is AMR wideband, and its meaning is relative to AMR-NB (namely, AMR). AMR-WB emerges with emergence of a broadband network and higher auditory requirements of users.

VoIP call drop information: It is used to collect statistics of call drops of the user in the process of performing the VoIP service.

Step 101: The wireless access device sends a quality parameter report of the VoIP service to a centralized processing device. The quality parameter report of the VoIP service includes the quality of service parameter of the VoIP service.

In the method for obtaining a quality of service parameter of a VoIP service according to this embodiment, a wireless access device obtains a quality of service parameter of a VoIP service, and the wireless access device sends a quality parameter report of the VoIP service to a centralized processing device. The quality parameter report of the VoIP service includes the quality of service parameter of the VoIP service, so that a network system obtains quality of service of the VoIP service according to the quality of service parameter of the VoIP service, further helping an operator control and adjust the network system based on the quality of service of the VoIP service.

Further, the foregoing parameter measurement performed by the wireless access device may be implemented in the following manner.

VoIP service packet size: It collects statistics of sizes of voice packets received at a PDCP layer.

VoIP service packet loss rate: It collects statistics of a total quantity of VoIP packets arriving at an eNB in a time period, and a total quantity of VoIP packets successfully sent by the eNB to UE. A packet loss rate calculated according to the two total quantities is a total quantity of unsuccessfully sent data packets divided by a total quantity of VoIP packets that arrive.

VoIP service encoding rate: It measures an encoding rate corresponding to each VoIP service, and then further measures a total amount of data in packets corresponding to each encoding rate in the time period.

Mean opinion value of the VoIP service: The MOS is an evaluation value of subjective perception of the user on voice quality, and may be obtained according to a delay, a jitter, and a packet loss.

VoIP signaling delay: A signaling delay includes a call setup delay or a handover delay. For the call setup delay, a time from receiving a VoIP service request by the wireless access device to sending a VoIP service request acknowledgement is measured, and the call setup delay of the user is calculated. A time of receiving the VoIP service request may be a time of arrival of the VoIP service request at the wireless access device, or a time of receiving an access layer access indication triggered by an access layer of the UE for sending the VoIP service request. A time of sending the VoIP service request acknowledgement is a time of sending a VoIP service setup acknowledgement message, or a time of sending, to the access layer of the UE, a bearer setup command for setting up a radio bearer for the VoIP service. For the handover delay, a time from starting a handover by the wireless access device to completion of the handover is measured, and a user handover delay is calculated. A specific time of starting the handover is a time of sending a radio bearer reconfiguration command including a handover command to the UE, or a time of receiving a handover request. A time of completion of the handover is a time of receiving context release signaling sent by a handover target cell, or a time of receiving a handover complete command reported by the UE, or a time of receiving a first data packet sent by the UE to a target cell.

VoIP access failure information: It collects statistics of access attempts in which a VoIP access request is received but no VoIP call is set up successfully.

VoIP handover failure information: It records and collects statistics of handover failures of the UE performing the VoIP service.

SPS resource utilization efficiency: SPS scheduling is generally used for VoIP when the wireless access device performs scheduling. The SPS scheduling refers to reserving a certain resource according to an interval of arrival of a voice packet, so that the UE directly performs data transmission on the corresponding resource instead of waiting for scheduling by the network every time. However, a voice packet is not generated exactly in a resource position reserved every time. Therefore, utilization efficiency of the SPS resource may be calculated according to a quantity of times that the SPS resource is actually used in a time period. A network administrator may measure, according to the efficiency, whether the SPS resource configured in the network is appropriate.

VoIP call drop information: It includes a VoIP call count, a VoIP call drop count, and a VoIP call drop rate, and is used to collect statistics of call drops of the user in the process of performing the VoIP service.

A method for collecting statistics of VoIP call drop information may be implemented in the following manner.

Method for collecting statistics on a wireless access network device side: The wireless access network device determines, according to a QCI in a received service setup command, whether an established service is a VoIP service. For example, if the QCI in the service setup command received by the wireless access network device is equal to 1, the wireless access network device considers that the service established at this time is a VoIP service. Statistics of multiple established VoIP services are collected, and a call drop rate is calculated. A specific call drop is reflected on the network side as follows: A RLF occurs on the UE performing the VoIP service or the access network device cannot receive a CQI reported by the UE, or the wireless access network device cannot receive a SRS signal of the UE, or an RLC layer of the wireless access network device cannot receive an acknowledgement, and the RLC layer of the wireless access network device is reset. The wireless access network device collects statistics of multiple VoIP calls of multiple UEs, then records VoIP call drops, and divides the VoIP call drop count by a total quantity of VoIP calls to calculate a call drop rate.

Method for collecting statistics on a UE side: The UE collects statistics of VoIP calls and VoIP call drops to calculate a call drop rate. A specific call drop is reflected as follows: An RLF occurs on the UE performing the VoIP service, or an RLC layer is reset.

Figure 12:
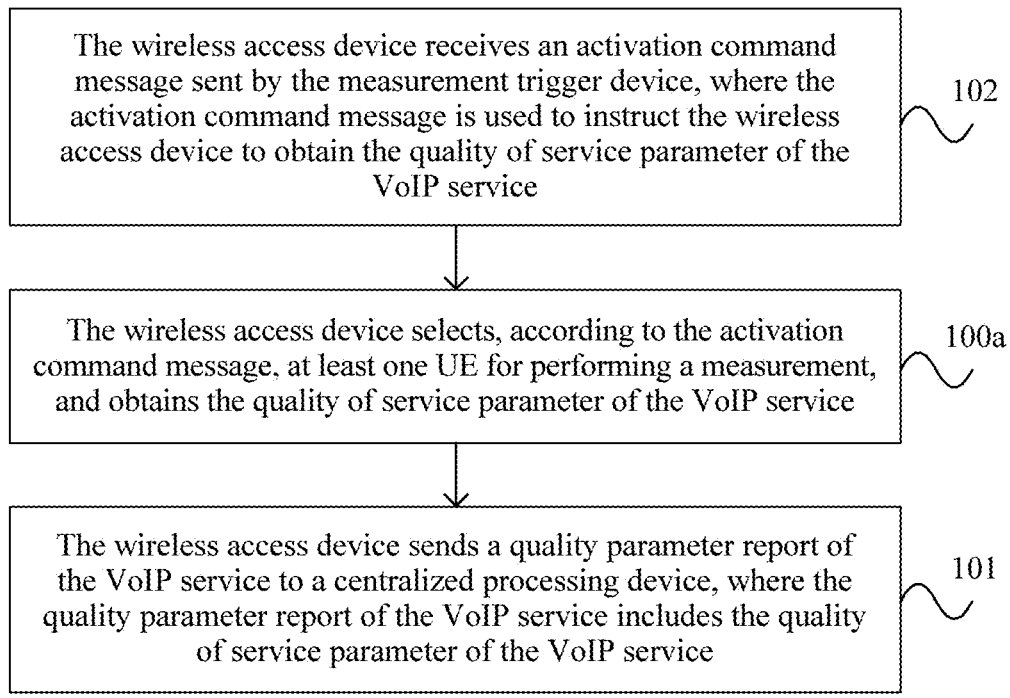
FIG. 12 is a schematic flowchart of another method for obtaining a quality of service parameter of a VoIP service according to an embodiment of the present disclosure.

Optionally, on a basis of FIG. 11, FIG. 12 is a schematic flowchart of another method for obtaining a quality of service parameter of a VoIP service according to an embodiment of the present disclosure. Referring to FIG. 12, before step 100, the method further includes the following steps.

Step 102: The wireless access device receives an activation command message sent by the measurement trigger device, where the activation command message is used to instruct the wireless access device to obtain the quality of service parameter of the VoIP service.

The activation command message may activate a cell measurement, or activate a UE measurement. Preferably, the activation command message further includes address information of the centralized processing device, so that the wireless access device sends a final measurement result to the centralized processing device according to the address information.

In a case of a UE measurement, a feasible implementation manner of step 100 is as follows.

Step 100a: The wireless access device selects, according to the activation command message, at least one UE for performing a measurement, and obtains the quality of service parameter of the VoIP service.

Since the activation command message gives an instruction for performing a measurement for only a wireless access device corresponding to a cell, the wireless access device needs to select UEs in the cell for performing a measurement. Therefore, when at least one UE is selected for performing a measurement, the following selection condition needs to be met: whether the at least one UE performs the VoIP service; and/or whether the at least one UE agrees to provide a measurement service for the wireless access device.

When the UE sets up the service, a core network notifies, using a bearer setup request, a base station to set up a bearer for the UE, where the bearer setup request carries a QCI. The base station may determine, according to the quality of service class, that the bearer is set up for the VoIP service. In addition, when the UE accesses the network, the core network notifies the base station of information about whether the UE agrees to perform an MDT operation. Therefore, the base station may know whether the UE agrees to provide a measurement service for the wireless access device.

When the activation command message gives an instruction for performing a UE measurement, the activation command message includes an identity of the at least one UE, so that the wireless access device measures the at least one corresponding UE according to the identity of the at least one UE, and obtains the quality of service parameter of the VoIP service of the at least one UE.

Optionally, the activation command message further includes quality of service parameter information that needs to be obtained, and the quality of service parameter information that needs to be obtained is used to represent any one or a combination of the following quality of service parameters: the VoIP service delay, the VoIP service jitter, the VoIP service encoding type, the VoIP service packet loss rate, the VoIP service encoding rate, the MOS of the VoIP service, the VoIP signaling delay, the VoIP access failure information, or the VoIP handover failure information.

For example, if the activation command carries an instruction for obtaining VoIP control statistics, it indicates that the VoIP signaling delay, the VoIP access failure information, and the VoIP handover failure information need to be obtained. For another example, if the activation command carries an instruction for obtaining VoIP data statistics, it indicates that the VoIP service delay, the VoIP service jitter, the VoIP service encoding type, the VoIP service packet loss rate, the VoIP service encoding rate, the MOS of the VoIP service, the VoIP signaling delay, the VoIP access failure information, the VoIP handover failure information, the SPS resource utilization efficiency, and the VoIP call drop information need to be obtained.

Figure 13:
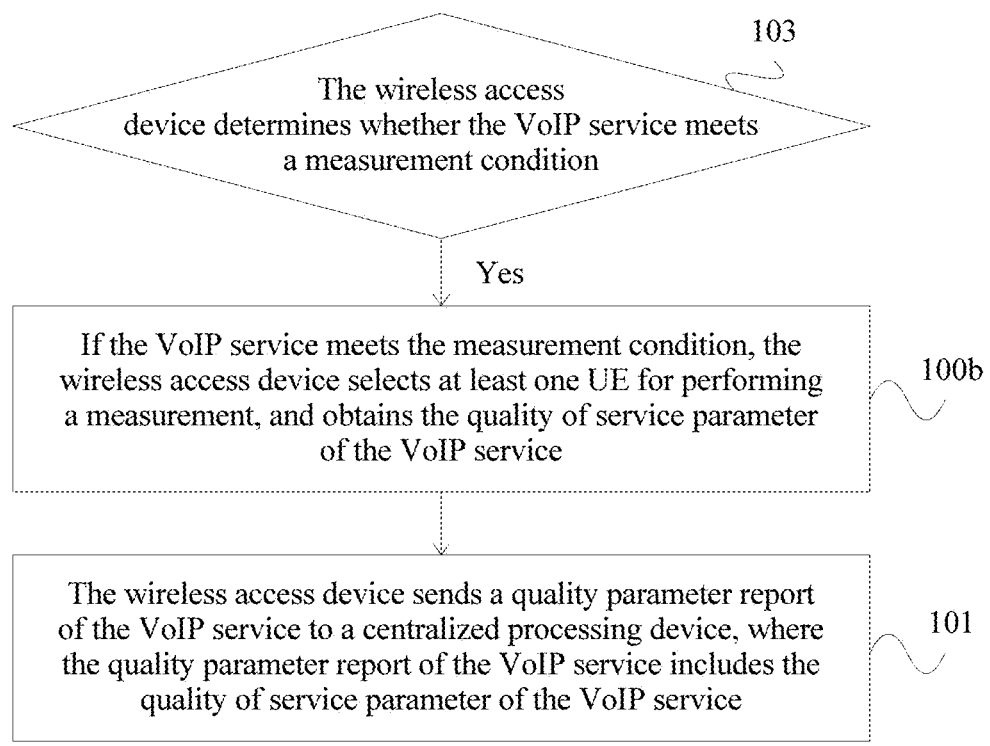
FIG. 13 is a schematic flowchart of another method for obtaining a quality of service parameter of a VoIP service according to an embodiment of the present disclosure.

Preferably, the wireless access device may also not require the activation command message sent by the measurement trigger device, but presets a measurement trigger mechanism, so as to trigger obtaining the quality of service parameter of the VoIP service. Further, on a basis of FIG. 11, FIG. 13 is a schematic flowchart of another method for obtaining a quality of service parameter of a VoIP service according to an embodiment of the present disclosure. Referring to FIG. 13, a feasible implementation manner of the measurement trigger mechanism is: before step 100, the method further includes the following steps.

Step 103: The wireless access device determines whether the VoIP service meets a measurement condition.

The measurement condition may be: the wireless access device determines whether a quantity of UEs that perform VoIP services in the cell to which the wireless access device belongs exceeds a certain threshold, and if yes, the measurement condition is met, and a subsequent measurement is triggered. It should be noted that, an implementation form of the measurement condition may be set according to a system requirement and is not limited herein.

Step 100b: If the VoIP service meets the measurement condition, the wireless access device selects at least one UE for performing a measurement, and obtains the quality of service parameter of the VoIP service.

Further, in the foregoing embodiment, the VoIP access failure information includes any one or a combination of the following: the VoIP access failure information count, identity information of a corresponding serving cell during the VoIP access failure, corresponding time information during the VoIP access failure, reference signal quality or strength of a corresponding cell during the VoIP access failure, or transmit power information of the UE during the VoIP access failure.

The VoIP handover failure information includes any one or a combination of the following: the VoIP handover failure count, reference signal quality or strength of a corresponding source cell and/or target cell during the VoIP handover failure, transmit power information of the UE during the VoIP handover failure, identity information of a corresponding source cell during the VoIP handover failure, or identity information of a corresponding target cell during the VoIP handover failure.

The VoIP service delay includes an uplink delay of the VoIP service and/or a downlink delay of the VoIP service; and the VoIP service jitter includes an uplink jitter of the VoIP service and/or a downlink jitter of the VoIP service.

For the quality of service parameters of the VoIP service, the following describes, using a specific embodiment, a method for obtaining some of the quality of service parameters.

A downlink delay of the VoIP service is obtained in the following manner.

The wireless access device obtains a downlink delay of a data packet of the VoIP service according to a first time and a second time, where the first time is a time at which the wireless access device receives an acknowledgement message of a last segment of the data packet, and the second time is a time of arrival of the data packet at a PDCP layer of the wireless access device.

Referring to FIG. 5, which is a process of sending a downlink data packet, T1 represents a time of generating a data packet, T2 is a delay of arrival of the data packet at a PDCP layer of the eNB, T3 is a time of sending the data packet at a MAC layer, and T4 is a time at which an acknowledgement message (ACK) of a last segment of the data packet is received. In this case, a downlink delay of the data packet of the VoIP service may be obtained in the following manner:

$$T\text{Delay}_{downlink} = T_4 - T_2 \quad (1)$$

$T_4$ is the time at which the base station receives the acknowledgement message of the last segment of the data packet, and $T_2$ is the time of arrival of the data packet at the PDCP layer of the base station.

Further, because a delay of one data packet cannot reflect accuracy of the downlink delay of the VoIP service in a time period in the system or cell, the downlink delay of the VoIP service in the time period can be obtained only by collecting statistics of downlink delays of data packets in the time period. The following provides two feasible implementation manners to summarize downlink delays of the VoIP service.

Manner 1: The wireless access device performs averaging on the downlink delays of all the data packets of the VoIP service in the time period, and obtains an average value of the downlink delays of the VoIP service in the time period.

Manner 2: The wireless access device compares a downlink delay of each data packet of the VoIP service in the time period with a downlink delay threshold, and collects statistics of downlink delays of the data packets of the VoIP service that are greater than or equal to the downlink delay threshold.

The wireless access device obtains a downlink jitter of the VoIP service according to a difference between downlink delays of any two data packets of the VoIP service in the time period.

Still referring to FIG. 5, the downlink jitter of the VoIP service is obtained using the following formula:

$$T_{downlink\ jitter} = (T_4 - T_2) - (T_4' - T_2').$$

$T_4$ is a time at which the base station receives an acknowledgement message of a last segment of an $i^{th}$ data packet, $T_2$ is a time of arrival of the $i^{th}$ data packet at the PDCP layer of the base station, $T_4'$ is a time at which the base station receives an acknowledgement message of a last segment of a $j^{th}$ data packet, $T_2'$ is a time of arrival of the $j^{th}$ data packet at the PDCP layer of the base station.

Further, because one downlink jitter value of the VoIP service alone cannot reflect accuracy of the downlink jitter of the VoIP service in a time period in the system or cell, statistics of downlink jitters of the VoIP service in the time period need to be collected. The following provides two feasible implementation manners to summarize downlink jitters of the VoIP service.

Manner 1: The wireless access device performs averaging on all the downlink jitters of the VoIP service in the time period, and obtains an average value of the downlink delays of the VoIP service in the time period.

Manner 2: The wireless access device compares each downlink jitter of the VoIP service in the time period with a downlink jitter threshold, and collects statistics of downlink jitters of the VoIP service that are greater than or equal to the downlink jitter threshold.

Figure 14:
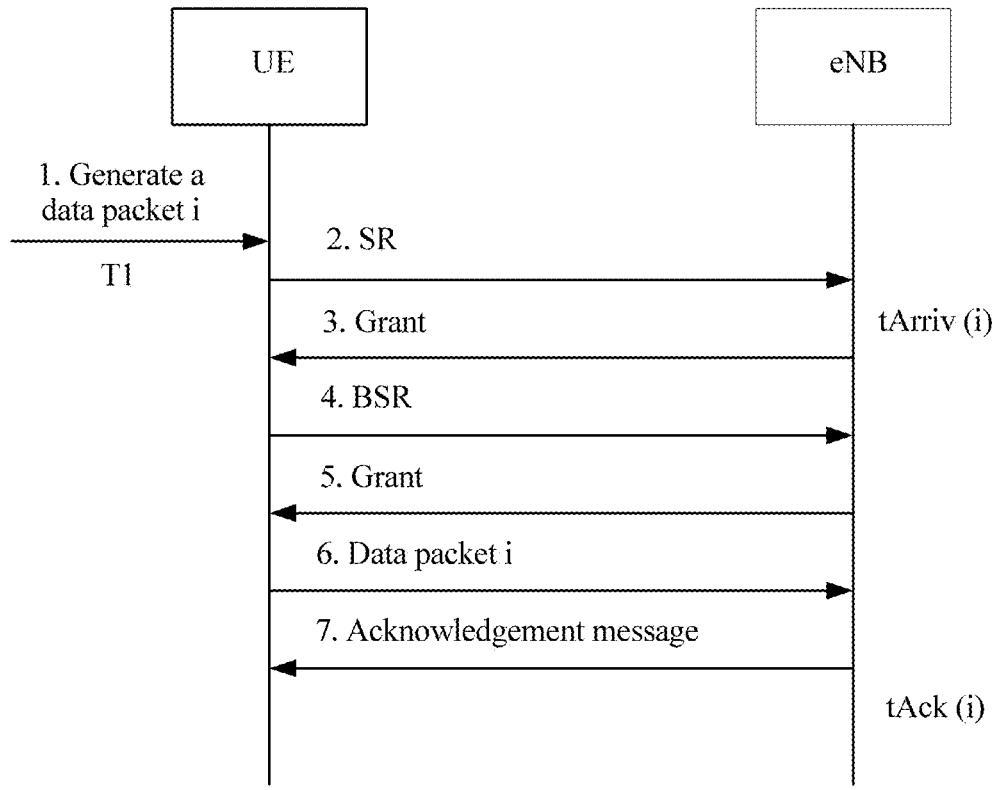
FIG. 14 is a schematic diagram of VoIP uplink data interaction in the prior art.

FIG. 14 is a schematic diagram of VoIP uplink data interaction in the prior art. Referring to FIG. 14, the interaction includes the following steps.

Step 1: UE generates a data packet i.

A time of generating the data packet i is marked with T1.

Step 2: The UE sends a scheduling request (SR) to an eNB.

A time of receiving the scheduling information is marked with tArriv(i).

Step 3: The UE receives a grant sent by the eNB.

The eNB sends a buffer status report (BSR) grant to the UE.

Step 4: The UE sends a BSR to the eNB.

Step 5: The UE receives the grant sent by the eNB.

The grant is a data transmission grant.

Step 6: The UE sends the data packet i to the eNB.

Step 7: The UE receives an acknowledgement message sent by the eNB.

A time of sending the acknowledgement message by the eNB is marked with tAck(i).

Based on the VoIP uplink data interaction shown in FIG. 14, preferably, an uplink delay of the VoIP service may be obtained in many manners. The following provides several feasible implementation manners.

Manner 1: The uplink delay of the VoIP service is obtained in the following manner.

The wireless access device obtains an uplink delay of a first data packet of the VoIP service according to a difference between an acknowledgement time and an arrival time, where the acknowledgement time is a time of sending an acknowledgement message of a last segment of the first data packet to the UE, and the arrival time is a time of receiving a scheduling request corresponding to the first data packet; and the wireless access device obtains an uplink delay of any other data packet of the VoIP service according to the uplink delay of the first data packet of the VoIP service and an RTP timestamp of the first data packet.

The uplink delay of the first data packet of the VoIP service is obtained using the following formula:

$$T\text{Delay}_{uplink}1 = T_{ACK} - T_{arrive}.$$

The first data packet is a first data packet that the UE is scheduled to transmit, every time the wireless access device receives a SR. $\text{TDelay}_{uplink}1$ is the uplink delay of the first data packet, $T_{ACK}$ is the time of sending the acknowledgement message of the last segment of the first data packet to the user equipment UE, and $T_{arrive}$ is the time of receiving the scheduling request corresponding to the first data packet.

According to the uplink delay of the first data packet of the VoIP service, an uplink delay of an $i^{th}$ data packet of the VoIP service is obtained using the following formula:

$$\text{TDelay}_{uplink}j=(T_{ACK}j-T_{ACK})-[\text{Timestamp}(j)-\text{Timestamp}(1)]\times T\text{counter}+T\text{Delay}_{uplink}1.$$

$\text{TDelay}_{uplink}j$ is an uplink delay of a $j^{th}$ data packet, $T_{ACK}j$ is a time at which the base station sends an acknowledgement message of a last segment of the $j^{th}$ data packet, Timestamp(j) is an RTP timestamp of the $j^{th}$ data packet, $T_{ACK}$ is the time at which the base station sends the acknowledgement message of the last segment of the first data packet, Timestamp(1) is the RTP timestamp of the first data packet, Tcounter is a time corresponding to a unit in the timestamp, and $\text{TDelay}_{uplink}1$ is the uplink delay of the first data packet.

However, when the manner 1 is used, because a delay generated at a time T1 at which the UE generates the data packet i is ignored, uplink delay processing of the first data packet is simplified. As a result, uplink delay statistics of the first data packet may be inaccurate, and therefore, all packet statistics have a certain offset.

To avoid a possible error caused by the manner 1, the following provides a manner 2 to correct the foregoing offset. The uplink delay of the VoIP service is obtained in the following manner.

Manner 2: The wireless access device obtains a first uplink delay of a data packet of the VoIP service according to a difference between a third time and a fourth time, where the third time is a time at which the wireless access device receives the data packet, and the fourth time is a time corresponding to an RTP timestamp of the data packet; the wireless access device obtains a delay set including delays of all the data packets in a time period, where the delay set includes first uplink delays of all the data packets of the VoIP service; the wireless access device obtains a first data packet having a shortest first delay in the delay set, as a reference data packet for delay calculation; and the wireless access device obtains an uplink delay of any other data packet of the VoIP service according to the corresponding uplink delay of the first data packet.

For example, the delay set of all the data packets is obtained, and the delay set of all the data packets is:

$$\{T_{sr\text{-}arrive}1 \ldots T_{sr\text{-}arrive}j \ldots T_{sr\text{-}arrive}n\}.$$

Further, $T_{sr\text{-}arrive}$ is obtained using the following formula:

$$T_{sr\text{-}arrive}=T_{arrive}-\text{Timestamp}\times T\text{counter}.$$

$T_{arrive}$ is a time of receiving a scheduling request corresponding to a data packet, Timestamp is a timestamp value of an RTP packet header in the data packet, and Tcounter is a time corresponding to a unit in the timestamp value.

A data packet q with shortest $T_{sr\text{-}arrive}$ in the delay set of all the data packets is obtained, where the delay of the data packet q is obtained using the following formula:

$$\text{TDelay}_{上行}q=T_{ACK}q-T_{arrive}q.$$

$T_{ACK}q$ is a time at which the base station sends an acknowledgement message of a last segment of the data packet q, and $T_{arrive}q$ is a time at which the base station receives the data packet q.

An uplink delay of any other data packet m of the VoIP service is obtained using the following formula:

$$\text{TDelay}_{uplink}m=(T_{ACK}m-T_{ACK}q)-[\text{Timestamp}(m)-\text{Timestamp}(q)]\times T\text{counter}+T\text{Delay}_{uplink}q.$$

$\text{TDelay}_{uplink}m$ is the uplink delay of the data packet m, $T_{ACK}m$ is a time at which the base station sends an acknowledgement message of a last segment of the data packet m, Timestamp(m) is a timestamp value of an RTP packet header in the data packet m, Timestamp(q) is a timestamp value of an RTP packet header in the data packet q, and Tcounter is a time corresponding to a unit in the timestamp value.

Figure 15:
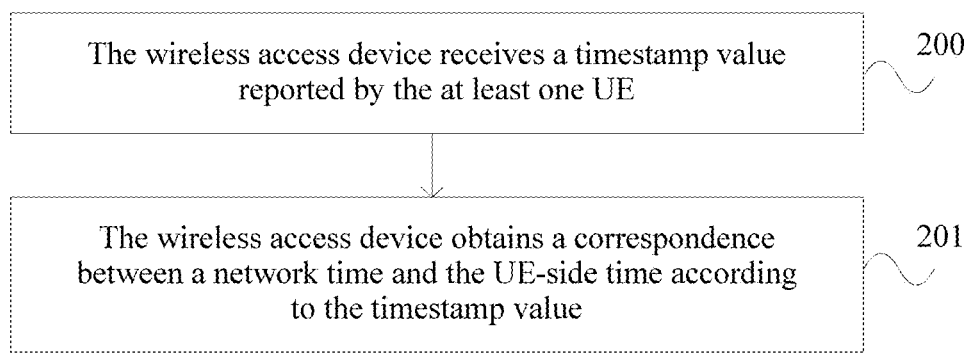
FIG. 15 is a schematic flowchart in which UE reports a timestamp value according to an embodiment of the present disclosure.

Manner 3: FIG. 15 is a schematic flowchart in which UE reports a timestamp value according to an embodiment of the present disclosure. Referring to FIG. 15, before the wireless access device obtains the quality of service parameter of the VoIP service, the method further includes the following steps.

Step 200: The wireless access device receives a timestamp value reported by the at least one UE.

An occasion of reporting the timestamp by the UE may be after the UE sets up a VoIP bearer with the wireless access device. Optionally, the wireless access device may send an RTP timestamp request to the UE, and the UE reports a timestamp value according to the request. The reported timestamp value represents an internal RTP timestamp value of the UE at a time point when a data packet including the timestamp is sent. Further, the UE may further report a time step value represented by the timestamp.

Step 201: The wireless access device obtains a correspondence between a network time and the UE-side time according to the timestamp value.

For example, if a timestamp reported by the UE is N, and a time at which the network receives a data packet including the timestamp is T1, a correspondence is that T1*Tcounter corresponds to the time N. For a time T2 at which the base station receives another data packet, a formula for calculating a corresponding network time is N+(T2−T1)*Tcounter. Tcounter is a step value of the RTP timestamp.

In this case, the uplink delay of the VoIP service is obtained in the following manner.

The wireless access device obtains, according to the correspondence between the network time and the UE-side time, a first network time corresponding to a time of sending a first data packet, obtains a second network time corresponding to a time at which the wireless access device acknowledges reception of the first data packet, and obtains an uplink delay of the first data packet of the VoIP service according to the first network time and the second network time.

For example, when the wireless access device receives a data packet r sent by the at least one UE, a network time T(1) corresponding to a time of sending the data packet r is obtained according to the correspondence. A delay of the data packet r is obtained using the following formula:

$$\text{TDelay}_{uplink}r=T_{ACK}r-T(1).$$

$\text{TDelay}_{uplink}r$ is the delay of the data packet r, and is a time at which the base station sends an acknowledgement message of a last segment of the data packet r to the UE.

Manner 4: The uplink delay of the VoIP service is obtained in the following manner.

The wireless access device obtains a data packet sent by the at least one UE, where the data packet carries a sending timestamp, and a correspondence exists between the sending timestamp and a network time of the wireless access device; and, the wireless access device may receive, using an air interface, the data packet sent by the UE.

The wireless access device obtains, according to the correspondence, the network time corresponding to the sending timestamp, and calculates an uplink delay of the data packet of the VoIP service according to the network time corresponding to the sending timestamp.

When the UE initializes the RTP timestamp, the UE performs initialization according to the network time, for example, performs initialization according to a SFN or according to a time indicated in a SIB16, for example, initial timestamp=network time SFN corresponding to the time+ subframe number. When receiving the data packet, the network-side wireless access device calculates, according to a relationship between the timestamp and the network time, the network time corresponding to the timestamp, and calculates the delay.

Further, because an uplink delay value of one data packet of the VoIP service alone cannot reflect the uplink delay of the VoIP service, statistics of uplink delays of the VoIP service in a time period need to be collected. The following provides two feasible implementation manners to summarize uplink delays of the VoIP service.

Manner 1: The wireless access device performs averaging on uplink delays of all the data packets of the VoIP service in the time period, and obtains an average value of the uplink delays of the VoIP service in the time period.

Manner 2: The wireless access device compares an uplink delay of each data packet of the VoIP service in the time period with an uplink delay threshold, and collects statistics of downlink delays of the VoIP service that are greater than or equal to the uplink delay threshold.

The wireless access device obtains an uplink jitter of the VoIP service according to a difference between uplink delays of any two data packets of the VoIP service in the time period.

Preferably, the wireless access device determines the difference between the uplink delays of the any two data packets of the VoIP service according to times of receiving the any two data packets and times corresponding to RTP timestamps of the any two data packets.

Further, because an uplink jitter value of one data packet of the VoIP service alone cannot reflect the uplink jitter of the VoIP service, statistics of uplink jitters of the VoIP service in a time period need to be collected. The following provides two feasible implementation manners to summarize uplink jitters of the VoIP service.

The wireless access device performs averaging on all uplink jitters of the VoIP service in the time period, and obtains an average value of the uplink jitters of the VoIP service in the time period; or the wireless access device compares each uplink jitter of the VoIP service in the time period with an uplink jitter threshold, and collects statistics of uplink jitters of the VoIP service that are greater than or equal to the uplink delay threshold.

Figure 16:
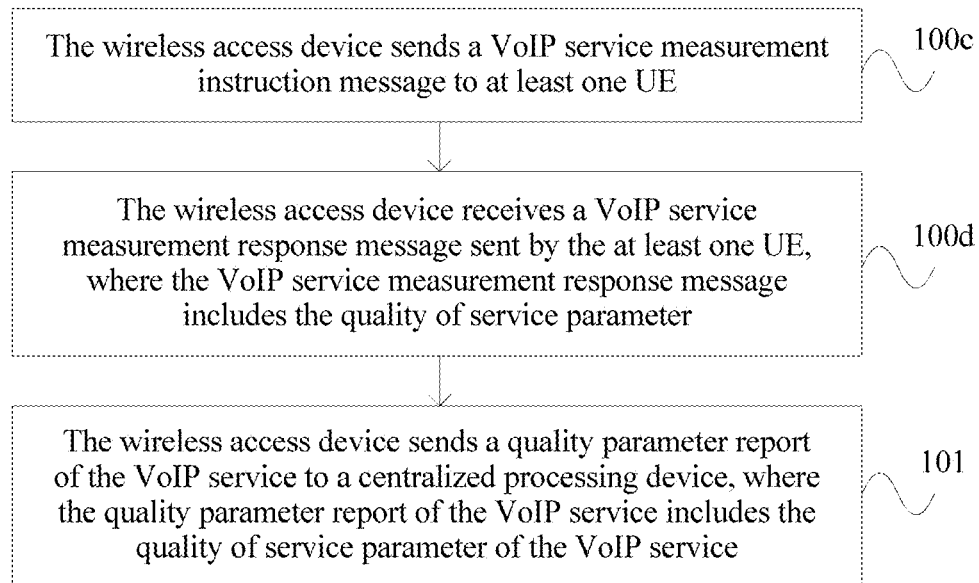
FIG. 16 is a schematic flowchart of another method for obtaining a quality of service parameter of a VoIP service according to an embodiment of the present disclosure.

Optionally, the wireless access device may also instruct the UE to measure the foregoing required quality of service parameter. On a basis of FIG. 11, FIG. 16 is a schematic flowchart of another method for obtaining a quality of service parameter of a VoIP service according to an embodiment of the present disclosure. Referring to FIG. 16, a specific implementation manner of step 100 is as follows.

Step 100c: The wireless access device sends a VoIP service measurement instruction message to at least one UE.

The VoIP service measurement instruction message instructs the UE to measure quality of service parameter information of the VoIP service, and the quality of service parameter information of the VoIP service is used to represent any one or a combination of the following parameters: the VoIP service delay, the VoIP service jitter, the VoIP service encoding type, the VoIP service packet loss rate, the VoIP service encoding rate, the MOS of the VoIP service, the VoIP signaling delay, the VoIP access failure information, the VoIP handover failure information, the SPS resource utilization efficiency, or the VoIP call drop information.

Step 100d: The wireless access device receives a VoIP service measurement response message sent by the at least one UE, where the VoIP service measurement response message includes the quality of service parameter.

For the VoIP service encoding type, the wireless access device can parse and record the encoding type in the VoIP data packet when transmitting the VoIP service; or the UE may also have the foregoing functions, and report the recorded VoIP service encoding type to the wireless access device.

Figure 17:
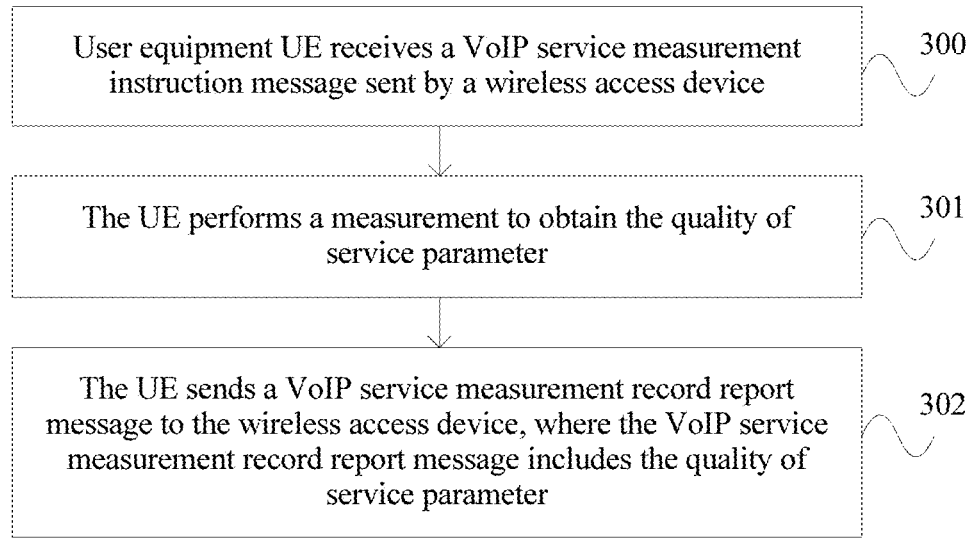
FIG. 17 is a schematic flowchart of another method for obtaining a quality of service parameter of a VoIP service according to an embodiment of the present disclosure.

FIG. 17 is a schematic flowchart of another method for obtaining a quality of service parameter of a VoIP service according to an embodiment of the present disclosure. The method is performed by user equipment UE. The UE may be a device such as a smartphone or a tablet. Referring to FIG. 17, the method includes the following steps.

Step 300: User equipment UE receives a VoIP service measurement instruction message sent by a wireless access device.

The VoIP service measurement instruction message includes quality of service parameter information that needs to be obtained, and the quality of service parameter information that needs to be obtained is used to represent any one or a combination of the following quality of service parameters: a VoIP service delay, a VoIP service jitter, a VoIP service encoding type, a VoIP service packet size, a VoIP service packet loss rate, a VoIP service encoding rate, a MOS of the VoIP service, a VoIP signaling delay, VoIP access failure information, VoIP handover failure information, SPS resource utilization efficiency, or VoIP call drop information.

Step 301: The UE performs a measurement to obtain the quality of service parameter.

Step 302: The UE sends a VoIP service measurement record report message to the wireless access device, where the VoIP service measurement record report message includes the quality of service parameter.

Optionally, after the UE receives a VoIP service measurement instruction message sent by a wireless access device 1 and obtains the quality of service parameter by performing a measurement according to the message, the UE may also report a VoIP service measurement record to a wireless access device 2. For example, because the UE moves and accesses another wireless access device, the UE may report to the another wireless access device.

In the method for obtaining a quality of service parameter of a VoIP service according to this embodiment, user equipment UE receives a VoIP service measurement instruction message sent by a wireless access device, where the VoIP service measurement instruction message instructs the user equipment to measure quality of service parameter information of a VoIP service; the UE performs a measurement to obtain the quality of service parameter; and the UE sends a VoIP service measurement record report message to the wireless access device, where the VoIP service measurement record report message includes the quality of service parameter, so that a network system obtains quality of service of the VoIP service according to the quality of service parameter of the VoIP service, further helping an operator control and adjust the network system based on the quality of service of the VoIP service.

Further, the foregoing parameter measurement performed by the UE may be implemented in the following manner.

VoIP service packet size: It collects statistics of sizes of voice packets received at a PDCP layer.

VoIP service packet loss rate: It collects statistics of a total quantity of VoIP packets arriving at the PDCP layer of the UE in a time period, and a total quantity of VoIP packets successfully sent by the UE to a base station. A packet loss rate calculated according to the two total quantities is a total quantity of unsuccessfully sent data packets divided by a total quantity of VoIP packets that arrive.

VoIP service encoding rate: It measures an encoding rate corresponding to each VoIP service, and then further measures a total amount of data in packets corresponding to each encoding rate in the time period.

Mean opinion value of the VoIP service: The MOS is an evaluation value of subjective perception of a user on voice quality, and may be obtained according to a delay, a jitter, and a packet loss.

VoIP signaling delay: A signaling delay includes a call setup delay or a handover delay. For the call setup delay, a time from receiving a VoIP service request by the wireless access device to sending a VoIP service request acknowledgement is measured, and the call setup delay of the user is calculated. A time of receiving the VoIP service request may be a time of arrival of the VoIP service request at the wireless access device, or a time of receiving an access layer access indication triggered by an access layer of the UE for sending the VoIP service request. A time of sending the VoIP service request acknowledgement is a time of sending a VoIP service setup acknowledgement message, or a time of sending, to the access layer of the UE, a bearer setup command for setting up a radio bearer for the VoIP service. For the handover delay, a time from starting a handover by the wireless access device to completion of the handover is measured, and a user handover delay is calculated. A specific time of starting the handover is a time of sending a radio bearer reconfiguration command including a handover command to the UE, or a time of receiving a handover request. A time of completion of the handover is a time of receiving context release signaling sent by a handover target cell, or a time of receiving a handover complete command reported by the UE, or a time of receiving a first data packet sent by the UE to a target cell.

VoIP access failure information: The UE collects statistics of access attempts in which a VoIP access request is initiated but no VoIP call is set up successfully.

VoIP handover failure information: It records and collects statistics of handover failures when the UE performs the VoIP service.

SPS resource utilization efficiency: The UE may calculate utilization efficiency of an SPS resource according to a quantity of times that the SPS resource is actually used in a time period.

VoIP call drop information: It includes a VoIP call count, a VoIP call drop count, and a VoIP call drop rate, and is used to collect statistics of call drops of the user in the process of performing the VoIP service.

A method for collecting statistics of VoIP call drop information may be implemented in the following manner.

Method for collecting statistics on a UE side: The UE collects statistics of VoIP calls and VoIP call drops to calculate a call drop rate. A specific call drop is reflected as follows: An RLF occurs on the UE performing the VoIP service, or an RLC layer is reset.

Further, the VoIP access failure information includes any one or a combination of the following: the VoIP access failure information count, identity information of a corresponding serving cell during the VoIP access failure, corresponding time information during the VoIP access failure, reference signal quality or strength of a corresponding cell during the VoIP access failure, or transmit power information of the UE during the VoIP access failure.

The VoIP handover failure information includes any one or a combination of the following: the VoIP handover failure count, reference signal quality or strength of a corresponding source cell or target cell during the VoIP handover failure, transmit power information of the UE during the VoIP handover failure, identity information of a corresponding source cell during the VoIP handover failure, or identity information of a corresponding target cell during the VoIP handover failure.

The VoIP service delay includes an uplink delay of the VoIP service and/or a downlink delay of the VoIP service; and the VoIP service jitter includes an uplink jitter of the VoIP service and/or a downlink jitter of the VoIP service.

An uplink delay of the VoIP service is obtained in the following manner.

The UE obtains an uplink delay of a data packet of the VoIP service according to a difference between a time of receiving an acknowledgement and a time of generating the data packet, where the time of receiving the acknowledgement is a time at which the UE receives an acknowledgement message sent by the wireless access device for a last segment of the data packet, and the time of generating the data packet is a time at which the UE generates the data packet.

Further, uplink delays of the VoIP service are summarized in the following manner.

The UE performs averaging on uplink delays of all the data packets of the VoIP service in a time period, and obtains an average value of the uplink delays of the VoIP service in the time period; or the UE compares an uplink delay of each data packet of the VoIP service in a time period with an uplink delay threshold, and collects statistics of downlink delays of the VoIP service that are greater than or equal to the uplink delay threshold.

The UE obtains an uplink jitter of the VoIP service according to a difference between uplink delays of any two data packets of the VoIP service in the time period. The uplink delay of the data may be calculated according to the foregoing delay calculation method, or may be calculated in a relative manner.

For example, an uplink delay of a $J^{th}$ packet is:

$$T\text{Delay}_{uplink}j = T_{ACK}j - [\text{Timestamp}(j)] \times T\text{counter}.$$

For example, an uplink delay of a $(J+1)^{th}$ packet is:

$$T\text{Delay}_{uplink}j+1 - [\text{Timestamp}(j+1)] \times T\text{counter}.$$

In this case, a jitter calculation formula is:

$$T\text{Delay}_{uplink}(j+1) - T\text{Delay}_{uplink}j = T_{ACK}(j+1) - T_{ACK}(j) - [\text{Timestamp}(j+1) - \text{Timestamp}(j)] \times T\text{counter}.$$

Although a clock used for recording a Timestamp in an RTP packet in the two calculation steps may be different from a network clock for calculating $T_{ACK}$, because two times actually used in jitter calculation are two relative acknowledgement times (times corresponding to $T_{ACK}$) and two relative packet generation times (times corresponding to the Timestamp), the jitter is not affected by asynchronization of the clocks, and the jitter may be calculated according to network acknowledgement times of the two data packets and the time indicated by the Timestamp in the RTP packet.

Further, uplink jitters of the VoIP service are summarized in the following manner.

The UE performs averaging on all uplink jitters of the VoIP service in the time period, and obtains an average value of the uplink jitters of the VoIP service in the time period; or the UE compares each uplink jitter of the VoIP service in the time period with an uplink jitter threshold, and collects statistics of uplink jitters of the VoIP service that are greater than or equal to the uplink delay threshold.

Preferably, the UE determines the difference between the uplink delays of the any two data packets of the VoIP service according to times of receiving the any two data packets and times corresponding to RTP timestamps of the any two data packets.

In the foregoing embodiment, regardless of whether the wireless access device or the UE obtains a measurement report, the obtaining may be implemented periodically. For example, according to a fixed period, the wireless access device or the UE collects statistics of service features of VoIP data in the period and performs averaging to obtain a measurement result. Alternatively, only measurement results that exceed a particular threshold, for example, a quantity of data packets whose delays exceed a particular time and delay values corresponding to the data packets, are collected.

It should be noted that, for a formula for obtaining the foregoing parameter by the UE, reference may be made to the embodiment of the base station side, and details are not described again in the embodiment of the UE side. After quality of service parameters in a time period are obtained, summarization may not be performed. Instead, the quality of service parameters are reported to the wireless access device, and the wireless access device performs summarization and statistical processing. For the manner of summarizing the quality of service parameters provided in the foregoing embodiment, only summarization processing is described. A person skilled in the art may develop other summarization manners based on the foregoing manner without creative efforts. Therefore, other summarization manners may also fall within the scope of this embodiment of the present disclosure.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An apparatus for obtaining a quality of service parameter of a voice over Internet Protocol (VoIP) service, comprising:
    a storage medium including executable instructions; and
    a processor, wherein the executable instructions, when executed by the processor, cause the apparatus to:
        obtain a quality of service parameter of a VoIP service, wherein the quality of service parameter of the VoIP service comprises a VoIP service delay, and the VoIP service delay comprises a downlink delay of the VoIP service;
        send a quality parameter report of the VoIP service to a centralized processing device, wherein the quality parameter report of the VoIP service comprises the quality of service parameter of the VoIP service;
        compare a downlink delay of each data packet of the VoIP service in a time period with a downlink delay threshold; and
        collect statistics of downlink delays of the data packets of the VoIP service that are greater than or equal to the downlink delay threshold.

2. The apparatus according to claim 1, wherein the quality of service parameter of the VoIP service further comprises a VoIP access failure information, and wherein the VoIP access failure information comprises any one or a combination of the following: a VoIP access failure information count, identity information of a corresponding serving cell during VoIP access failure, corresponding time information during the VoIP access failure, reference signal quality or strength of a corresponding cell during the VoIP access failure, or transmit power information of user equipment (UE) during the VoIP access failure.

3. The apparatus according to claim 1, wherein the quality of service parameter further comprises a VoIP service jitter, and wherein the VoIP service jitter comprises any one or a combination of an uplink jitter of the VoIP service or a downlink jitter of the VoIP service.

4. The apparatus according to claim 3, wherein the executable instructions, when executed by the processor, further cause the apparatus to obtain a downlink delay of a data packet of the VoIP service according to a first time and a second time, wherein the first time is a time of receiving an acknowledgement message of a last segment of the data packet, and wherein the second time is a time of arrival of the data packet at a Packet Data Convergence Protocol (PDCP) layer of the apparatus.

5. The method according to claim 1, wherein the quality of service parameter of the VoIP service further comprises at least one of the following: a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling (SPS) resource utilization efficiency, and VoIP call drop information.

6. An apparatus for obtaining a quality of service parameter of a voice over Internet Protocol (VoIP) service, comprising:
    a storage medium including executable instructions; and
    a processor, wherein the executable instructions, when executed by the processor, cause the apparatus to:
        receive a VoIP service measurement instruction message sent from a wireless access device, wherein the VoIP service measurement instruction message instructs the processor to measure quality of service parameter information of a VoIP service, and wherein the quality of service parameter information of the VoIP service is used to represent a quality of service parameter, the quality of service parameter comprises a VoIP service delay, and the VoIP service delay comprises a uplink delay of the VoIP service;
        perform a measurement to obtain the quality of service parameter;
        send a VoIP service measurement record report message to the wireless access device, wherein the VoIP service measurement record report message comprises the quality of service parameter;

compare an uplink delay of each data packet of the VoIP service in a time period with an uplink delay threshold; and collect statistics of uplink delays of the VoIP service that are greater than or equal to the uplink delay threshold.

7. The apparatus according to claim 6, wherein the quality of service parameter of the VoIP service further comprises a VoIP access failure information, and wherein the VoIP access failure information comprises any one or a combination of the following: a VoIP access failure information count, identity information of a corresponding serving cell during VoIP access failure, corresponding time information during the VoIP access failure, reference signal quality or strength of a corresponding cell during the VoIP access failure, or transmit power information of user equipment (UE) during the VoIP access failure.

8. The apparatus according to claim 6, wherein the quality of service parameter further comprises a VoIP service jitter, and wherein the VoIP service jitter comprises an uplink jitter of the VoIP service.

9. The apparatus according to claim 8, wherein executable instructions, when executed by the processor, further cause the apparatus to obtain an uplink delay of a data packet of the VoIP service according to a difference between a time of receiving an acknowledgement and a time of generating the data packet, wherein the time of receiving the acknowledgement is a time at which the communications interface receives an acknowledgement message sent by the wireless access device for a last segment of the data packet, and wherein the time of generating the data packet is a time at which UE generates the data packet.

10. The method according to claim 6, wherein the quality of service parameter of the VoIP service further comprises at least one of the following: a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling (SPS) resource utilization efficiency, and VoIP call drop information.

11. A method for obtaining a quality of service parameter of a voice over Internet Protocol (VoIP) service, comprising:

obtaining, by a wireless access device, a quality of service parameter of a VoIP service, wherein the quality of service parameter of the VoIP service comprises a VoIP service delay, and the VoIP service delay comprises a downlink delay of the VoIP service; and sending, by the wireless access device, a quality parameter report of the VoIP service to a centralized processing device, wherein the quality parameter report of the VoIP service comprises the quality of service parameter of the VoIP service, wherein downlink delays of the VoIP service are summarized by:

comparing, by the wireless access device, a downlink delay of each data packet of the VoIP service in a time period with a downlink delay threshold; and collecting statistics of downlink delays of the data packets of the VoIP service that are greater than or equal to the downlink delay threshold.

12. The method according to claim 11, wherein the quality of service parameter of the VoIP service further comprises a VoIP access failure information, and wherein the VoIP access failure information comprises any one or a combination of the following: a VoIP access failure information count, identity information of a corresponding serving cell during VoIP access failure, corresponding time information during the VoIP access failure, reference signal quality or strength of a corresponding cell during the VoIP access failure, or transmit power information of user equipment (UE) during the VoIP access failure.

13. The method according to claim 11, wherein the quality of service parameter further comprises a VoIP service jitter, and wherein the VoIP service jitter comprises any one or a combination of an uplink jitter of the VoIP service or a downlink jitter of the VoIP service.

14. The method according to claim 13, wherein the downlink delay of the VoIP service is obtained by the wireless access device obtaining a downlink delay of a data packet of the VoIP service according to a first time and a second time, wherein the first time is a time at which the wireless access device receives an acknowledgement message of a last segment of the data packet, and wherein the second time is a time of arrival of the data packet at a Packet Data Convergence Protocol (PDCP) layer of the wireless access device.

15. The method according to claim 11, wherein the quality of service parameter of the VoIP service further comprises at least one of the following: a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling (SPS) resource utilization efficiency, and VoIP call drop information.

16. A method for obtaining a quality of service parameter of a voice over Internet Protocol (VoIP) service, comprising:

receiving, by user equipment (UE), a VoIP service measurement instruction message sent by a wireless access device, wherein the VoIP service measurement instruction message instructs the user equipment to measure quality of service parameter information of a VoIP service, and wherein the quality of service parameter information of the VoIP service is used to represent a quality of service parameter, the quality of service parameter comprises a VoIP service delay, and the VoIP service delay comprises a uplink delay of the VoIP service;

performing, by the UE, a measurement to obtain the quality of service parameter; and sending, by the UE, a VoIP service measurement record report message to the wireless access device, wherein the VoIP service measurement record report message comprises the quality of service parameter, wherein the uplink delays of the VoIP service are summarized by comparing, by the UE, an uplink delay of each data packet of the VoIP service in a time period with an uplink delay threshold; and collecting statistics of uplink delays of the VoIP service that are greater than or equal to the uplink delay threshold.

17. The method according to claim 16, wherein the quality of service parameter of the VoIP service further comprises a VoIP access failure information, and wherein the VoIP access failure information comprises any one or a combination of the following: a VoIP access failure information count, identity information of a corresponding serving cell during VoIP access failure, corresponding time information during the VoIP access failure, reference signal quality or strength of a corresponding cell during the VoIP access failure, or transmit power information of the UE during the VoIP access failure.

18. The method according to claim 16, wherein the quality of service parameter further comprises a VoIP service jitter, and wherein the VoIP service jitter comprises an uplink jitter of the VoIP service.

19. The method according to claim 18, wherein the uplink delay of the VoIP service is obtained by the UE obtaining an uplink delay of a data packet of the VoIP service according to a difference between a time of receiving an acknowledgement and a time of generating the data packet, wherein the time of receiving the acknowledgement is a time at which the UE receives an acknowledgement message sent by the wireless access device for a last segment of the data packet, and wherein the time of generating the data packet is a time at which the UE generates the data packet.

20. The method according to claim 16, wherein the quality of service parameter of the VoIP service further comprises at least one of the following: a VoIP service jitter, a VoIP service encoding type, a VoIP service packet size, a VoIP service packet loss rate, a VoIP service encoding rate, a mean opinion value of the VoIP service, a VoIP signaling delay, VoIP access failure information, VoIP handover failure information, semi-persistent scheduling (SPS) resource utilization efficiency, and VoIP call drop information.

* * * * *